(12) United States Patent
Xie et al.

(10) Patent No.: US 11,741,629 B2
(45) Date of Patent: *Aug. 29, 2023

(54) CONTROLLING DISPLAY OF MODEL DERIVED FROM CAPTURED IMAGE

(71) Applicant: Beijing Sensetime Technology Development Co., Ltd., Beijing (CN)

(72) Inventors: Fubao Xie, Beijing (CN); Wentao Liu, Beijing (CN); Chen Qian, Beijing (CN)

(73) Assignee: Beijing Sensetime Technology Development Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/102,305

(22) Filed: Nov. 23, 2020

(65) Prior Publication Data
US 2021/0074003 A1 Mar. 11, 2021

Related U.S. Application Data

(63) Continuation of application No. PCT/CN2020/072520, filed on Jan. 16, 2020.

(30) Foreign Application Priority Data

Jan. 18, 2019 (CN) .......................... 201910049830.6
Apr. 30, 2019 (CN) .......................... 201910365188.2

(51) Int. Cl.
*G06T 7/73* (2017.01)
*G06T 11/60* (2006.01)
(Continued)

(52) U.S. Cl.
CPC .............. *G06T 7/73* (2017.01); *G06T 7/0014* (2013.01); *G06T 7/246* (2017.01); *G06T 7/74* (2017.01);
(Continued)

(58) Field of Classification Search
None
See application file for complete search history.

(56) References Cited

U.S. PATENT DOCUMENTS 4,561,066 A 12/1985 Emmons et al.
6,657,628 B1 12/2003 Cook
(Continued)

FOREIGN PATENT DOCUMENTS

CN 101930284 A 12/2010
CN 102824176 A 12/2012
(Continued)

OTHER PUBLICATIONS

Pavllo et al.; "QuaterNet: A Quaternion-based Recurrent Model for Human Motion;" British Machine Vision Conference (BMVC), 2018; pp. 1-14; available on line arXiv.org—1805.06485v2, Jul. 2018 (Year: 2018).*

(Continued)

*Primary Examiner* — Edward Martello

(57) ABSTRACT

Embodiments of the present disclosure disclose image processing methods and apparatuses, image devices, and storage media. The image processing method includes: obtaining an image; obtaining the feature of the limb of the body based on the image, where the limb includes the upper limb and/or the lower limb; determining first-type movement information of the limb based on the feature; and controlling the movement of the limb of a controlled model according to the first-type movement information.

16 Claims, 9 Drawing Sheets

(51) Int. Cl.
*G06T 7/246* (2017.01)
*G06T 13/40* (2011.01)
*G06T 7/00* (2017.01)
*G06V 40/10* (2022.01)
*G06V 40/16* (2022.01)
*G06V 10/75* (2022.01)
*G06V 10/24* (2022.01)

(52) U.S. Cl.
CPC .............. *G06T 11/60* (2013.01); *G06T 13/40* (2013.01); *G06V 10/24* (2022.01); *G06V 10/754* (2022.01); *G06V 40/10* (2022.01); *G06V 40/176* (2022.01); *G06T 2200/04* (2013.01); *G06T 2207/30196* (2013.01); *G06T 2207/30201* (2013.01)

(56) References Cited

U.S. PATENT DOCUMENTS

| | | | |
|---|---|---|---|
| 9,177,409 B2 * | 11/2015 | Rennuit | G06T 13/40 |
| 10,022,628 B1 * | 7/2018 | Matsumiya | A63F 13/57 |
| 10,319,133 B1 * | 6/2019 | Fleischer | G06T 13/40 |
| 2007/0126743 A1 * | 6/2007 | Park | G06T 7/74 |
| | | | 345/474 |
| 2007/0146371 A1 * | 6/2007 | Dariush | B25J 9/1602 |
| | | | 345/474 |
| 2010/0149341 A1 | 6/2010 | Marks et al. | |
| 2010/0197391 A1 | 8/2010 | Geiss | |
| 2010/0197399 A1 | 8/2010 | Geiss | |
| 2010/0322111 A1 | 12/2010 | Li | |
| 2011/0249865 A1 * | 10/2011 | Lee | G06K 9/00362 |
| | | | 382/103 |
| 2012/0218262 A1 * | 8/2012 | Yomdin | G06T 13/80 |
| | | | 345/419 |
| 2013/0195330 A1 | 8/2013 | Kim et al. | |
| 2013/0243255 A1 * | 9/2013 | Williams | G06F 3/011 |
| | | | 382/103 |
| 2014/0219557 A1 | 8/2014 | Liao | |
| 2015/0003687 A1 | 1/2015 | Utsunomiya et al. | |
| 2015/0036879 A1 | 2/2015 | Shiozaki et al. | |
| 2015/0161797 A1 | 6/2015 | Park et al. | |
| 2015/0199824 A1 * | 7/2015 | Kim | G06K 9/00355 |
| | | | 382/103 |
| 2016/0098095 A1 | 4/2016 | Gonzalez-Banos et al. | |
| 2016/0163084 A1 | 6/2016 | Corazza | |
| 2016/0267699 A1 * | 9/2016 | Borke | G06F 3/011 |
| 2017/0270709 A1 | 9/2017 | Tran et al. | |
| 2018/0158196 A1 | 6/2018 | Marks | |
| 2018/0165860 A1 * | 6/2018 | Noh | G06F 3/04847 |
| 2018/0335843 A1 | 11/2018 | Erivantcev et al. | |
| 2018/0345116 A1 | 12/2018 | Wantanabe et al. | |
| 2019/0156574 A1 | 5/2019 | Fu et al. | |
| 2019/0251341 A1 | 8/2019 | Nie et al. | |
| 2021/0026516 A1 | 1/2021 | Holz | |

FOREIGN PATENT DOCUMENTS

| | | |
|---|---|---|
| CN | 103971113 A | 8/2014 |
| CN | 104700433 A | 6/2015 |
| CN | 104866101 A | 8/2015 |
| CN | 106251396 A | 12/2016 |
| CN | 108027597 A | 5/2018 |
| CN | 108205654 A | 6/2018 |
| CN | 108227931 A | 6/2018 |
| CN | 108229239 A | 6/2018 |
| CN | 108229332 A | 6/2018 |
| CN | 108305321 A | 7/2018 |
| CN | 108357595 A | 8/2018 |
| CN | 108427942 A | 8/2018 |
| CN | 108472028 A | 8/2018 |
| CN | 108765274 A | 11/2018 |
| CN | 108874119 A | 11/2018 |
| CN | 109035415 A | 12/2018 |
| CN | 109146629 A | 1/2019 |
| CN | 109325450 A | 2/2019 |
| CN | 109816773 A | 5/2019 |
| CN | 110139115 A | 8/2019 |
| CN | 110688008 A | 1/2020 |
| CN | 110889382 A | 3/2020 |
| JP | 2002024807 A | 1/2002 |
| JP | 2003150977 A | 5/2003 |
| JP | 2007004732 A | 1/2007 |
| JP | 2007333690 A | 12/2007 |
| JP | 2012516504 A | 7/2012 |
| JP | 2012234541 A | 11/2012 |
| JP | 2015116308 A | 6/2015 |
| JP | 2015148706 A | 8/2015 |
| JP | 2017138915 A | 8/2017 |
| JP | 2017191576 A | 10/2017 |
| JP | 2018505462 A | 2/2018 |
| JP | 2018119833 A | 8/2018 |
| JP | 2018169720 A | 11/2018 |
| WO | 2018207388 A1 | 11/2018 |

OTHER PUBLICATIONS

Fraagkiadaki et al.; "Recurrent Network Models for Human Dynamics;" Proceedings of the IEEE International Conference on Computer Vision (ICCV), 2015, pp. 4346-4354 (Year: 2015).*

Chen et al.:"Adversarial PoseNet: A Structure-aware Convolutional Network for Human Pose Estimation;" Proceedings of the IEEE International Conference on Computer Vision (ICCV), 2017, pp. 1212-1221 (Year: 2017).*

Walker et al.; "The Pose Knows: Video Forecasting by Generating Pose Futures;" Proceedings of the IEEE International Conference on Computer Vision (ICCV), 2017, pp. 3332-3341 (Year: 2017).*

International Search Report for Application No. PCT/CN2020/072549, dated Apr. 21, 2020, 4 pages.

International Search Report for Application No. PCT/CN2020/072550, dated Apr. 21, 2020, 5 pages.

International Search Report for Application No. PCT/CN2020/072526, dated Apr. 21, 2020, 6 pages.

International Search Report for Application No. PCT/CN2020/072520, dated Apr. 23, 2020, 4 pages.

Zuo, Guo-Yu et al., "Operator Attitude Algorithm for Telerobotic Nursing System", Acta Automatica Sinica,vol. 42, No. 12, ISSN:0254-4156, Dec. 31, 2016, 11 pages (English Abstract).

Feng, Liang et al, "Research on Motion Control Technology of Virtual Human's Lower Limb Based on Optical Motion Capture Data", Journal of System Simulation, vol. 27, No. 2, Feb. 28, 2015, 10 pages (English Abstract).

Zhang, Zuoyun, "The Design and Implementation of Kinect-Based Motion Capture System", ISSN:1674-0246, China Master's Theses Full-text Database, Information Science, Apr. 15, 2018, 97 pages (English Abstract).

Office Action and Search Report Issued in Chinese Application No. 2019103651882, dated Apr. 6, 2021, 27 pages.

She Dairui et al, "Based on Operational Degree of Virtual Human Hand Motion Control of Obstacle Avoidance Algorithm" vol. 31 No. 12, Dec. 31, 2014, 6 pages [English abstract].

Chih-Wei Lin et al, "Indirect Adaptive Fuzzy Decoupling Control With a Lower Limb Exoskeleton" Proceedings of 2016 International Conference on Advanced Robotics and Intelligent Systems, Taipei Nangang Exhibition Center, Taipei, Taiwan, Aug. 31~Sep. 2, 2016, 5 pages.

State Intellectual Property Office of the People's Republic of China, Office Action and Search Report Issued in Application No. 201910365188.2, dated Jul. 9, 2021, 29 pages.

State Intellectual Property Office of the People's Republic of China, Office Action and Search Report Issued in Application No. 201910365188.2, dated Sep. 26, 2021, 24 pages.

Intellectual property India, Office Action Issued in Application No. 202027050357, dated Sep. 10, 2021, 7 pages.

Intellectual property India, Office Action Issued in Application No. 202027050399, dated Sep. 6, 2021, 6 pages.

Intellectual property India, Office Action Issued in Application No. 202027050802, dated Sep. 27, 2021, 6 pages.

(56) References Cited

OTHER PUBLICATIONS

Lun et al., "The Design and Implementation of a Kinect-Based Framework for Selective Human Activity Tracking," 2016 IEEE International Conference on Systems, Man, and Cybernetics SMC 2016, Oct. 9-12, 2016, Budapest, Hungary, 6 pages.

ISA State Intellectual Property Office of the People's Republic of China, Written Opinion of the International Searching Authority Issued in Application No. PCT/CN2020/072549, dated Apr. 21, 2020, WIPO, 13 pages.

ISA State Intellectual Property Office of the People's Republic of China, Written Opinion of the International Searching Authority Issued in Application No. PCT/CN2020/072550, dated Apr. 21, 2020, WIPO, 15 pages.

ISA State Intellectual Property Office of the People's Republic of China, Written Opinion of the International Searching Authority Issued in Application No. PCT/CN2020/072520, dated Apr. 23, 2020, WIPO, 13 pages.

ISA State Intellectual Property Office of the People's Republic of China, Written Opinion of the International Searching Authority Issued in Application No. PCT/CN2020/072526, dated Apr. 21, 2020, WIPO, 15 pages.

Non-Final Office Action Issued in U.S. Appl. No. 17/102,331, dated Oct. 6, 2021, 44 pages.

Non-Final Office Action Issued in U.S. Appl. No. 17/102,364, dated Oct. 4, 2021, 52 pages.

Intellectual property India, Office Action Issued in Application No. 202027050400, dated Dec. 13, 2021, 6 pages.

Japanese Patent Office Action, Office Action Issued in Application No. 2020-565269, dated Jan. 5, 2022, 10 pages.

Japanese Patent Office Action, Office Action Issued in Application No. 2020-567116, dated Jan. 20, 2022, 12 pages.

Non-Final Office Action Issued in U.S. Appl. No. 17/102,373, dated Dec. 9, 2021, 60 pages.

Japanese Patent Office, Decision of Rejection Issued in Application No. 2020-567116, dated May 17, 2022, 7 pages.

Japanese Patent Office Action, Office Action Issued in Application No. 2021-516694, dated May 18, 2022, 14 pages.

Japanese Search Report by Registered Search Organization, Application No. 2021-516694, Industrial Property Cooperation Center, dated Apr. 1, 2022, 28 pages.

Advisory Action Issued in U.S. Appl. No. 17/102,364, dated May 27, 2022, 5 pages.

Final Office Action Issued in U.S. Appl. No. 17/102,364, dated Mar. 17, 2022, 47 pages.

Advisory Action Issued in U.S. Appl. No. 17/102,331, dated May 27, 2022, 3 pages.

Final Office Action Issued in U.S. Appl. No. 17/102,331, dated Mar. 15, 2022, 42 pages.

Ryuzo Okada et al., "Virtual fashion show using marker-less motion capture", Electronic Information and Communication Society Technology Research Report, Mar. 10, 2005, 6 pages [English Abstract].

United States Patent and Trademark Office, Non-Final Office Action Issued in U.S. Appl. No. 17/102,331, dated Jul. 5, 2022, 40 pages.

United States Patent and Trademark Office, Non-Final Office Action Issued in U.S. Appl. No. 17/102,364, dated Aug. 18, 2022, 41 pages.

Tian et al., "Facial Expression Analysis" Chapter 11 in "Handbook of Face Recognition" Springer, New York, NY. pp. 247-275 (Year: 2005).

Lien et al., "Subtly different facial expression recognition and expression intensity estimation" Proceedings of the IEEE International Conference on Computer Vision and Pattern Recognition, Jun. 1998, pp. 853-859.

Mahoor et al., "A framework for automated measurement of the intensity of non-posed Facial Action Units" IEEE Conference on Computer Vision and Pattern Recognition, CVPR Jun. 2009; pp. 1-7.

Zhang et al., "Dynamic Facial Expression Analysis and Synthesis With MPEG-4 Facial Animation Parameters" IEEE Transactions on Circuits and Systems for Video Technology, vol. 18, No. 10, Oct. 2008, pp. 1383-1396.

\* cited by examiner ical Field

The present application relates to image processing methods and apparatuses, image devices, and storage media.

BACKGROUND

With the development of information technology, users can use video recording for online teaching, live streaming, motion sensing games, etc. The motion sensing game requires users to wear specific motion sensing devices to detect activities of bodies thereof, etc. so as to control game characters, while during online teaching or live streaming, the face, body, etc. of users is totally exposed in the network, which may involve both the user privacy and information security problems. In order to solve the privacy or security problem, mosaic or other modes may be used for shielding a face image, etc. However, this may affect the video effect.

SUMMARY

In view of the above, embodiments of the present application are expected to provide an image processing method and apparatus, an image device, and a storage medium. In order to achieve the foregoing objective, the technical solution of the present application is implemented as follows.

For a first aspect, the present disclosure provides an image processing method, including: obtaining an image; obtaining the feature of the limb of the body based on the image, where the limb includes the upper limb and/or the lower limb; determining first-type movement information of the limb based on the feature; and controlling the movement of the limb of a controlled model according to the first-type movement information.

Based on the solution above, determining the first-type movement information of the limb based on the feature includes: detecting position information of a keypoint of the limb in the image; and determining the first-type movement information according to the position information.

Based on the solution above, the method further includes: detecting position information of a keypoint of the body skeleton in the image. Obtaining the feature of the limb of the body based on the image includes: determining position information of a keypoint of the limb based on the position information of the keypoint of the body skeleton.

Based on the solution above, determining the first-type movement information according to the position information includes: determining a position box including a first part of the limb in the image according to the position information of the keypoint of the limb; detecting position information of a keypoint of the first part based on the position box; and obtaining first-type movement information of the first part based on the position information of the keypoint of the first part.

Based on the solution above, determining the position box including the first part of the limb in the image according to the position information of the keypoint of the limb includes: determining a position box including the hand in the image according to position information of a hand keypoint.

Based on the solution above, detecting the position information of the keypoint of the first part based on the position box includes: detecting, based on the position box, position information of a keypoint corresponding to a finger joint and/or position information of a keypoint corresponding to a fingertip on the hand.

Based on the solution above, obtaining the first-type movement information of the first part based on the position information of the keypoint of the first part includes: obtaining movement information of a finger of the hand based on the position information of the keypoint of the first part.

Based on the solution above, determining the first-type movement information of the limb based on the feature further includes: determining first-type movement information of a second part of the limb according to the position information of the keypoint of the limb.

Based on the solution above, the method further includes: determining, based on position information of keypoints of two parts of the limb connected by means of a connection portion, second-type movement information of the connection portion.

Based on the solution above, the method further includes: determining second-type movement information of the connection portion according to features of at least two parts and a first movement constraint condition of the connection portion, where the at least two parts include the two parts connected through the connection portion; and controlling the movement of the connection portion of the controlled model according to the second-type movement information.

Based on the solution above, controlling the movement of the connection portion of the controlled model according to the second-type movement information includes: determining the control mode of controlling the connection portion according to the type of the connection portion; and controlling the movement of the connection portion of the controlled model according to the control mode and the second-type movement information.

Based on the solution above, determining the control mode of controlling the connection portion according to the type of the connection portion includes: in the case that the connection portion is a first-type connection portion, determining that the control mode is a first-type control mode, where the first-type control mode is used for directly controlling the movement of the connection portion in the controlled model corresponding to the first-type connection portion.

Based on the solution above, determining the control mode of controlling the connection portion according to the type of the connection portion includes: in the case that the connection portion is a second-type connection portion, determining that the control mode is a second-type control mode, where the second-type control mode is used for indirectly controlling the movement of the connection portion in the controlled model corresponding to the second-type connection portion; and the indirect control is achieved by controlling the part in the controlled model corresponding to the part other than the second-type connection portion.

Based on the solution above, controlling the movement of the connection portion of the controlled model according to the control mode and the second-type movement information includes: in the case that the control mode is the second-type control mode, decomposing the second-type movement information to obtain first-type rotation information of the connection portion that a drawing portion draws the connection portion to rotate; adjusting movement information of the drawing portion according to the first-type rotation information; and controlling the movement of the drawing portion in the controlled model by using the adjusted movement information of the drawing portion so as to indirectly control the movement of the connection portion.

Based on the solution above, the method further includes: decomposing the second-type movement information to obtain second-type rotation information of the second-type connection portion rotating relative to the drawing portion; and controlling the rotation of the connection portion relative to the drawing portion in the controlled model by using the second-type rotation information.

Based on the solution above, the first-type connection portion includes the elbow and the knee, and the second-type connection portion includes the wrist and the ankle.

Based on the solution above, in the case that the second-type connection portion is the wrist, the drawing portion corresponding to the wrist includes the upper arm and/or forearm, and in the case that the second-type connection portion is the ankle, the drawing portion corresponding to the ankle includes the shank and/or the thigh.

Based on the solution above, obtaining the feature of the limb of the body based on the image includes: obtaining a first 2-Dimensional (2D) coordinate of the limb based on a 2D image; and determining the first-type movement information of the limb based on the feature includes: obtaining a first 3D coordinate corresponding to the first 2D coordinate based on the first 2D coordinate and the conversion relation from a 2D coordinate to a 3-Dimensional (3D) coordinate.

Based on the solution above, obtaining the feature of the limb of the body based on the image includes: obtaining a second 3D coordinate of a skeleton keypoint of the limb based on a 3D image; and determining the first-type movement information of the limb based on the feature includes: obtaining a third 3D coordinate based on the second 3D coordinate.

Based on the solution above, obtaining the third 3D coordinate based on the second 3D coordinate includes: adjusting, based on the second 3D coordinate, a 3D coordinate of a skeleton keypoint of the limb corresponding to the occluded portion in the 3D image so as to obtain the third 3D coordinate.

Based on the solution above, the first-type movement information includes a quaternion.

According to the second aspect, the present disclosure provides an image processing apparatus, including: a first obtaining module configured to obtain an image; a second obtaining module configured to obtain the feature of the limb of the body based on the image, where the limb includes the upper limb and/or the lower limb; a first determination module configured to determine first-type movement information of the limb based on the feature; and a control module configured to control the movement of the limb of a controlled model according to the first-type movement information.

According to the third aspect, the present disclosure provides an image device, including: a memory; and a processor connected to the memory and configured to execute computer executable instructions on the memory so as to implement the image processing method provided in any of the foregoing technical solutions.

According to the fourth aspect, the present disclosure provides a non-volatile computer storage medium, where the computer storage medium stores computer executable instructions. After being executed by a processor, the computer executable instructions can implement the image processing method provided in any of the foregoing technical solutions.

According to the image processing method provided in the embodiments of the present application, the action of the limb of an object is acquired by image acquisition, and then the action of the limb of a controlled model is controlled. In this way, the controlled model can simulate the movement of the acquired object such as a user by controlling the action of the limb of the controlled model so as to achieve video teaching, video lecture, live streaming, game control, etc. At the same time, the acquired object can be hidden by replacing the acquired object with the controlled model so as to protect the user privacy and improve the information security.

DETAILED DESCRIPTIONS

The technical solutions of the present application are further described in detail below with reference to the accompanying drawings and specific embodiments of the specification.

Figure 1:
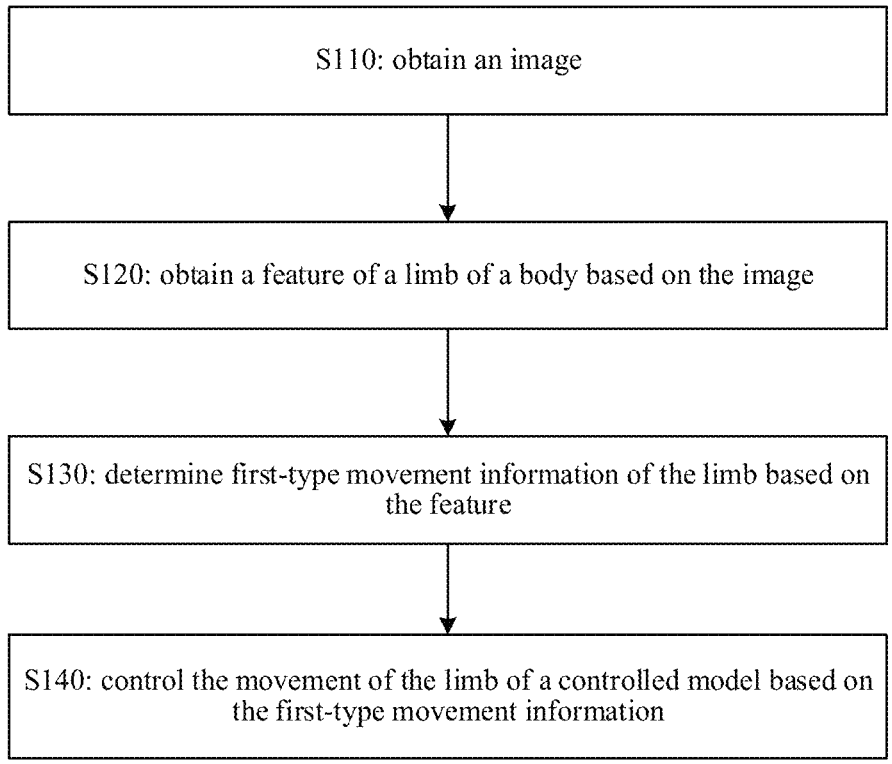
FIG. 1 is a schematic flowchart of a first image processing method provided by embodiments of the present disclosure.

As shown in FIG. 1, the present embodiments provide an image processing method, including the following steps S110-S140.

At step S110, an image is obtained.

At step S120, the feature of the limb of the body is obtained based on the image, where the limb includes the upper limb and/or the lower limb.

At step S130, first-type movement information of the limb is determined based on the feature.

At step S140, the movement of the limb of a controlled model is controlled according to the first-type movement information.

According to the image processing method provided by the present embodiments, the movement of a controlled model can be driven by image processing.

The image processing method provided by the present embodiments can be applied in an image device. The image device can be any electronic device capable of performing image processing, e.g. an electronic device for image acquisition, image display, and image pixel reorganization. The image device includes, but is not limited to different terminal devices, e.g. a mobile terminal and/or a fixed terminal, and can also include different servers capable of providing an image service. The mobile terminal includes a cell phone, a tablet computer, or other portable devices easy to carry by a user, and can also include a device worn by the user, e.g. a smart wristband, a smart watch, smart glasses, etc. The fixed terminal includes a fixed desktop computer, etc.

In the present embodiments, the image obtained in the step S110 can be a 2D image or a 3D image. The 2D image can include an image acquired by a monocular or binocular camera, e.g. red, green, blue (RGB) images, etc. The approach of obtaining an image includes any one of: acquiring an image by a camera of an image device; receiving an image from an external device; and reading an image from a local database or a local memory.

The 3D image can be obtained by detecting a 2D coordinate from the 2D image, and then using a conversion algorithm from the 2D coordinate to a 3D coordinate, or an image acquired by a 3D camera.

The image obtained in the step S110 can be one frame image or a multi-frame image. For example, when the obtained image is one frame image, the subsequently obtained movement information can reflect the movement of the limb in the current image relative to the limb corresponding to an initial coordinate system (which can be also called as a camera coordinate system). For another example, when the obtained image is a multi-frame image, the subsequently obtained movement information can reflect the movement of the limb in the current image relative to the limb corresponding to the first few frame images or reflect the movement of the limb in the current image relative to the limb corresponding to a camera coordinate system. The number of obtained images is not limited in the present application.

The limb of the body can include the upper limb and/or the lower limb. First-type movement information is obtained in step S130 based on the feature to at least represent the change in the movement of the limb. In the present embodiments, deep learning models such as a neural network can be used for detecting the feature of the image.

A controlled model can be a model corresponding to a target. For example, if the target is a person, the controlled model is a body model, and if the target is animal, the controlled model is a body model corresponding to the animal. In the present embodiments, the controlled model is a model for the category to which the target belongs, and can be pre-determined.

In the present embodiments, the body movement of a user can be directly transferred to the controlled model by the executions of the step S110 to the step S140. In this way, the body movement of a controlled object can be conveniently controlled by means of image acquisition of a camera when a user does not need to wear a motion sensing device.

For example, during the process of live streaming or presentation, if a user does not want to use the real portrait, but expects the controlled model to simulate the body movement thereof so as to improve the effect of live streaming or the power of presentation, the method can be used for protecting the user privacy and guaranteeing the effect desired by the user.

In some embodiments, the step S130 can include: detecting position information of a keypoint of the limb in the image; and determining the first-type movement information according to the position information.

The position information of the keypoint of the limb includes, but is not limited to position information of a skeleton keypoint and/or position information of a contour keypoint. The information of the skeleton keypoint refers to information of a keypoint of the skeleton. The position information of the contour keypoint refers to position information of a keypoint of an outer surface of the limb.

The coordinates of the body with different postures change relative to the reference posture; therefore, the first-type movement information can be determined according to the coordinates.

In the present embodiments, the first-type movement information can be determined conveniently and quickly by detecting position information of a keypoint, and can be directly taken as movement parameter for driving a controlled model to move.

In some embodiments, the method further includes: detecting position information of a keypoint of the body skeleton in the image, and detecting position information of the keypoint of the limb in the image includes: determining position information of the keypoint of the limb based on the position information of the keypoint of the body skeleton.

In the present embodiments, position information of keypoints of the body skeleton of the whole body can be first obtained by using deep learning models such as a neural network so as to determine position information of a keypoint of the limb based on the distribution of the position information of the keypoints of the whole body. After the position information of the keypoints of the whole body is obtained, the keypoints are connected to obtain the skeleton, and it can be determined which keypoints are keypoints of the limb based on the relative distribution position of bones and joints in the skeleton so as to determine the position information of the keypoint of the limb.

In still another embodiment, the position where the limb is located can be first identified by means of body identification, etc., and position information of the keypoint is extracted only for the position where the limb is located.

Figure 2:
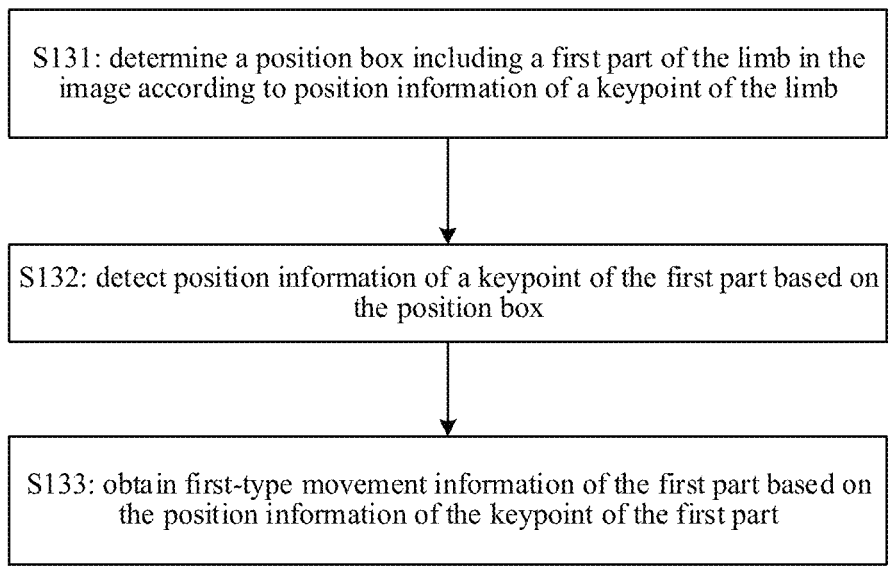
FIG. 2 is a schematic flowchart of detecting first-type movement information of a first part provided by the embodiments of the present disclosure.

In some embodiments, as shown in FIG. 2, the step S130 can include the following steps.

At step S131, a position box including a first part of the limb is determined in the image according to position information of a keypoint of the limb.

At step S132, the position information of the keypoint of the first part is detected based on the position box.

At step S133, first-type movement information of the first part is obtained based on the position information of the keypoint of the first part.

In the present embodiments, in order to precisely simulate the movement of the limb, the movement of the limb can be further decomposed in details. If the limb is an upper limb, the movement of the upper limb not only includes the movement of the upper arm and the lower arm (which is also called as forearm), but also includes the movement of a finger of the hand with a finer movement range.

In the present embodiments, the first part can be the hand or foot. An image region including the first part can be framed out from an image based on the obtained position box. Position information of a keypoint is further obtained for the image region.

For example, position information of a keypoint corresponding to a finger joint is extracted from the hand. When the hand is in different postures, fingers are presented in different states, which means that the position and direction of the finger joint are different, and can be reflected by the keypoints of the finger joint.

In some embodiments, the step S131 can include: determining a position box including the hand in the image according to position information of a hand keypoint. The position box can be rectangular or non-rectangular.

For example, when the first part is the hand, the position box can be a hand-type box matching the shape of the hand. The hand-type box can be generated by detecting a contour keypoint of the hand. For another example, a rectangular bounding box including all the skeleton keypoints is obtained by detecting a skeleton keypoint of the hand, and the bounding box is a regular rectangular box.

Furthermore, the step S132 can include: detecting, based on the position box, position information of a keypoint corresponding to a finger joint and/or position information of a keypoint corresponding to a fingertip on the hand.

Figure 3:
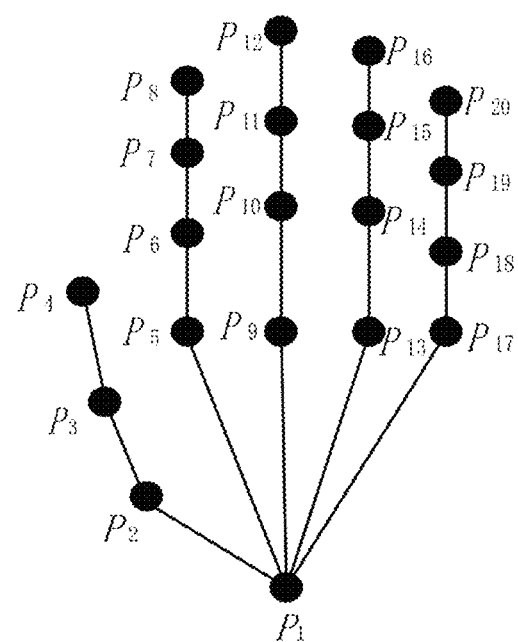
FIG. 3 is a schematic diagram of a hand keypoint provided by the embodiments of the present disclosure.

FIG. 3 is a schematic diagram of a hand keypoint. FIG. 3 shows 20 a hand keypoint, i.e., keypoints of the finger joint and keypoints of the fingertip of five fingers, respectively, which correspond to keypoints P1 to P20 in FIG. 3.

The determination of the keypoints of the finger joint can control the movement of finger joints of a controlled model, and the determination of the keypoints of the fingertip can control the movement of the fingertip of the controlled model so as to achieve finer control in the body transfer process.

In some embodiments, the step S130 can include: obtaining movement information of a finger of the hand based on the position information.

In some embodiments, determining first-type movement information of the limb based on the feature further includes: determining first-type movement information of a second part of the limb according to position information of a keypoint of the limb.

The second part here refers to the part other than the first part on the limb. For example, taking an upper limb as an example, if the first part is the hand, the second part includes the lower arm, the upper arm between the elbow and the shoulder joint, etc. The first-type movement information of the second part can be directly obtained based on the position information of the keypoint of the limb.

Therefore, in the present embodiments, respective first-type movement information of different parts is obtained by different modes according to features of different parts of the limb so as to precisely control different parts of the limb in a controlled model.

In some embodiments, the method further includes: determining, based on position information of keypoints of two parts of the limb connected by means of a connection portion, second-type movement information of the connection portion.

Figure 4:
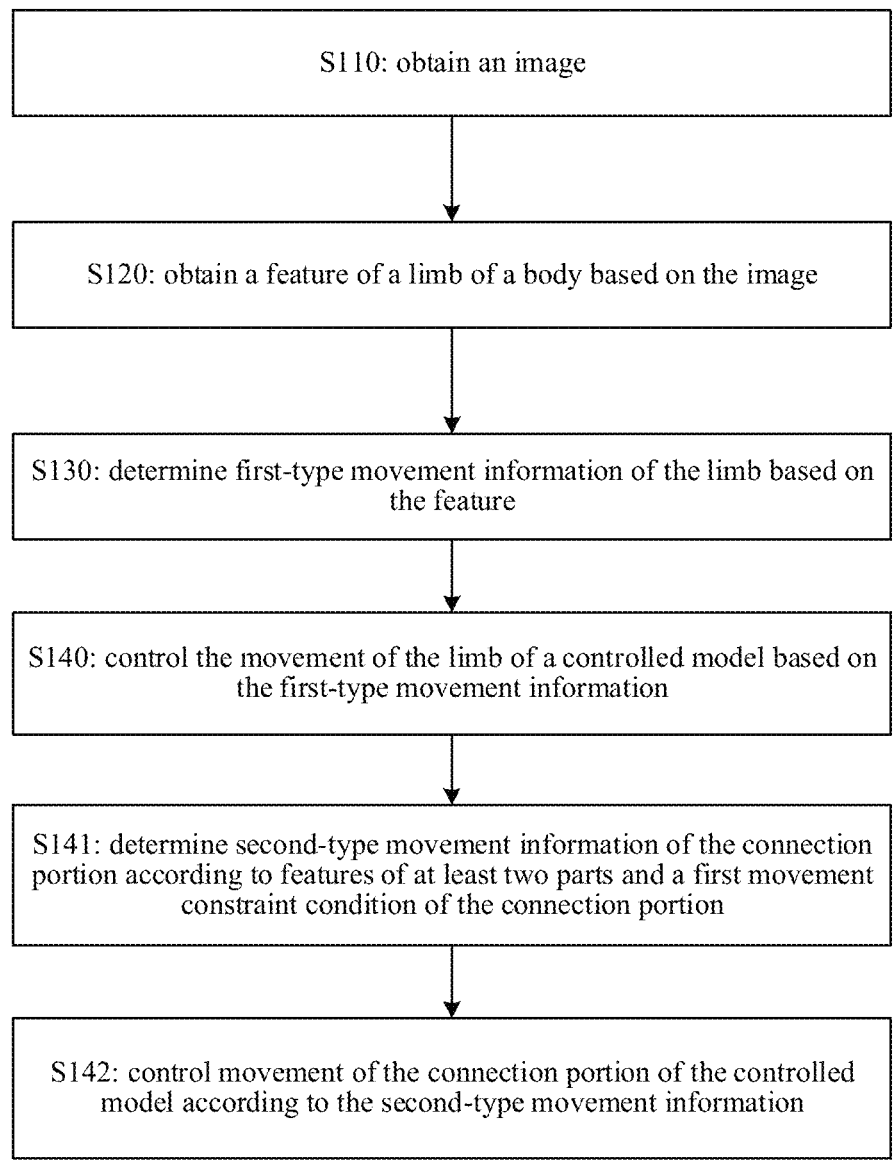
FIG. 4 is a schematic flowchart of a second image processing method provided by the embodiments of the present disclosure.

In some embodiments, as shown in FIG. 4, the step S140 can further include the following steps on the basis of FIG. 1.

At step S141, second-type movement information of the connection portion is determined according to features of at least two parts and a first movement constraint condition of the connection portion, where the at least two parts include the two parts connected through the connection portion.

At step S142, the movement of the connection portion of the controlled model is controlled according to the second-type movement information.

The connection portion can be connected to two other parts. For example, taking a person as an example, the neck, wrist, ankle or waist is a connection portion connected to two parts; taking an upper limb of a person as an example, the connection portion can include the wrist connecting the hand to the lower arm, the elbow connecting the upper arm to the lower arm, etc.; taking the lower limb as an example, the connection portion can include the ankle connecting the foot to the shank, and the knee connecting the shank to the thigh.

Movement information of these connection portions (i.e., the second-type movement information) may not be directly conveniently detected or rely on other parts adjacent thereto to some extent; therefore, the second-type movement information can be determined according to other parts connected to the connection portions.

In the present embodiments, the step S142 further includes: determining the control mode according to the type of the connection portion; and controlling the movement of the connection portion corresponding to a controlled model based on the control mode.

For example, by taking the direction where the upper arm extends to the hand as a shaft, the lateral rotation of the wrist is caused by the rotation of the upper arm. For another example, by taking the direction where the shank extends as a shaft, the lateral rotation of the ankle is also directly driven by the shank.

In some other embodiments, determining the control mode of controlling the connection portion according to the type of the connection portion includes: in the case that the connection portion is a first-type connection portion, determining that the control mode is a first-type control mode, where the first-type control mode is used for directly controlling the movement of the connection portion in the controlled model corresponding to the first-type connection portion.

In the present embodiments, the first-type connection portion rotates itself, and is not driven by other parts to rotate.

A second-type connection portion is a connection portion other than the first-type connection portion in the connection portions, and the rotation of the second-type connection portion includes the rotation generated by the drawing of other parts.

In some embodiments, determining the control mode of controlling the connection portion according to the type of the connection portion includes: in the case that the connection portion is a second-type connection portion, determining that the control mode is a second-type control mode, where the second-type control mode is used for indirectly controlling the movement of the connection portion in the controlled model corresponding to the second-type connection portion; and the indirect control is achieved by controlling the part in the controlled model corresponding to the part other than the second-type connection portion.

The part other than the second-type connection portion includes, but is not limited to: the part directly connected to the second-type connection portion or the part indirectly connected to the second-type connection portion. For example, when the wrist laterally rotates, the entire upper limb may move, and both the shoulder and the elbow rotate. In this way, the rotation of the elbow is indirectly controlled by controlling the lateral rotation of the shoulder and/or the elbow.

In some embodiments, controlling the movement of the connection portion of the controlled model according to the control mode and the second-type movement information includes: in the case that the control mode is the second-type control mode, decomposing the second-type movement information to obtain first-type rotation information of the connection portion that a drawing portion draws the connection portion to rotate; adjusting movement information of the drawing portion according to the first-type rotation information; and controlling the movement of the drawing portion in the controlled model by using the adjusted movement information of the drawing portion so as to indirectly control the movement of the connection portion.

In the present embodiments, first-type rotation information is not rotation information generated by the movement of a second-type connection portion, but movement information of the second-type connection portion relative to a specific reference point (e.g. the center of the human body) of a target generated when the second-type connection portion is caused by the movements of other parts (i.e., a drawing portion) connected to the second-type connection portion.

In the present embodiments, the drawing portion is a part directly connected to the second-type connection portion. If taking the wrist as the second-type connection portion as an example, the drawing portion can be the forearm above the wrist to the shoulder. If taking the ankle as the second-type connection portion as an example, the drawing portion can be the shank above the ankle to the thigh.

For example, the lateral rotation of the wrist along the straight direction of the shoulder and the elbow to the wrist may be a rotation driven by the shoulder or the elbow. However, during movement information detection, the lateral rotation is caused by the movement of the wrist. In this way, the lateral rotation of the wrist should be essentially assigned to the elbow or the shoulder. Through this transfer of assignment, the movement information of the elbow or the shoulder can be adjusted, and the movement of the elbow or the shoulder in a controlled model is controlled by using the adjusted movement information. In this way, the lateral rotation corresponding to the elbow or the shoulder is reflected by the wrist of the controlled model from the perspective of the image, thereby achieving the precise simulation of the movement of a target by the controlled model.

In some embodiments, the method further includes: decomposing the second-type movement information to obtain second-type rotation information the second-type connection portion relative rotating to the drawing portion; and controlling the rotation of the connection portion relative to the drawing portion in the controlled model by using the second-type rotation information.

In the present embodiments, movement information of a second-type connection portion relative to a predetermined posture can be first learnt according to the feature of the second-type connection portion, e.g. a 2D coordinate or a 3D coordinate. The movement information is called as second-type movement information, which includes, but is not limited to rotation information.

The first-type rotation information can be information directly obtained by an information model according to the feature of an image, where the information model extracts the rotation information, while second-type rotation information is rotation information obtained by adjusting the first-type rotation information. In some embodiments, the first-type connection portion includes the elbow and the knee, and the second-type connection portion includes the wrist and the ankle.

In some other embodiments, if the second-type connection portion is the wrist, the drawing portion corresponding to the wrist includes the upper arm and/or forearm, and if the second-type connection portion is the ankle, the drawing portion corresponding to the ankle includes the shank and/or the thigh.

In some embodiments, the first-type connection portion includes the neck connecting the head to the torso.

In still other embodiments, determining second-type movement information of the connection portion according to features of the at least two parts and a first movement constraint condition of the connection portion includes: determining orientation information of the at least two parts according to the features of the at least two parts; determining candidate orientation information of the connection portion according to the orientation information of the at least two parts; and determining second-type movement information of the connection portion according to the candidate orientation information and the first movement constraint condition.

In some embodiments, determining candidate orientation information of the connection portion according to the orientation information of the at least two parts includes: determining a first candidate orientation and a second candidate orientation of the connection portion according to the orientation information of the at least two parts.

Two included angles may be formed between the orientation information of two parts. In the present embodiments, the included angle satisfying the first movement constraint condition is taken as the second-type movement information.

For example, two included angles are formed between the orientation of the face and that of the torso. The sum of the two included angles is 180 degrees. Assuming that the two included angles are a first included angle and a second included angle, respectively, and a first movement constraint condition of the neck connecting the face to the torso ranges from −90 to 90 degrees, the angle exceeding 90 degrees is excluded according to the first movement constraint condition. In this way, during the simulation of target movement by a controlled model, it is possible to reduce the occurrence of abnormalities in which a rotation angle exceeds 90 degrees clockwise or counterclockwise, for example, 120 degrees or 180 degrees.

For example, taking the neck as an example, with the face facing right, the corresponding orientation of the neck may be 90 degrees to the right or 270 degrees to the left. However, according to the physiological structure of the human body, it is impossible to change the orientation of the neck of the human body to make the neck fact right by turning left 270 degrees. In this case, the orientation of the neck is 90 degrees to the right and 270 degrees to the left, which are both candidate orientation information. Orientation information of the neck needs to be further determined according to the first movement constraint condition. In the present example, 90 degrees to the right of the neck is target orientation information of the neck, and according to 90 degrees to the right of the neck, it is determined that the current second-type movement information of the neck is turning right 90 degrees.

In some embodiments, determining second-type movement information of the connection portion according to the candidate orientation information and the first movement constraint condition includes: selecting target orientation information within the orientation change constraint range from the first candidate orientation information and the second candidate orientation information; and determining the second-type movement information according to the target orientation information.

The target orientation information here refers to information satisfying the first movement constraint condition.

In some embodiments, determining orientation information of the at least two parts according to the features of the at least two parts includes: obtaining a first keypoint and a second keypoint of each of the at least two parts; obtaining a first reference point of each of the at least two parts, where the first reference point is a predetermined keypoint in the target; generating a first vector based on the first keypoint and the first reference point and generating a second vector based on the second keypoint and the first reference point; and determining orientation information of each of the at least two parts based on the first vector and the second vector.

If the first of the two parts is the shoulder of the human body, a first reference point of the first part can be a waist keypoint of the target or the midpoint of keypoints of two crotches. If the second of the two parts is the face, the first reference point of the second part can be a connection point of the neck and the shoulder connected to the face.

In some embodiments, determining orientation information of each of the at least two parts based on the two vectors includes: performing cross product on the first vector and the second vector of one part to obtain a normal vector of the plane where the part is located; and taking the normal vector as orientation information of the part.

If the normal vector is determined, the orientation of the plane where the part is located is also determined.

In some embodiments, determining the movement information of the connection portion based on movement information of the at least two parts includes: obtaining a third 3D coordinate of the connection portion relative to a second reference point; and obtaining absolute rotation information of the connection portion according to the third 3D coordinate. Controlling the movement of the connection portion of the controlled model according to the movement information of the connection portion includes: controlling the movement of the connection portion of the controlled model based on the absolute rotation information.

In some embodiments, the second reference point can be one of keypoints of a part of a target. Taking a person as the target as an example, the second reference point can be a keypoint of the part connected to the first-type connection portion. For example, taking the neck as an example, the second reference point can be a keypoint of the shoulder connected to the neck.

Figure 8A:
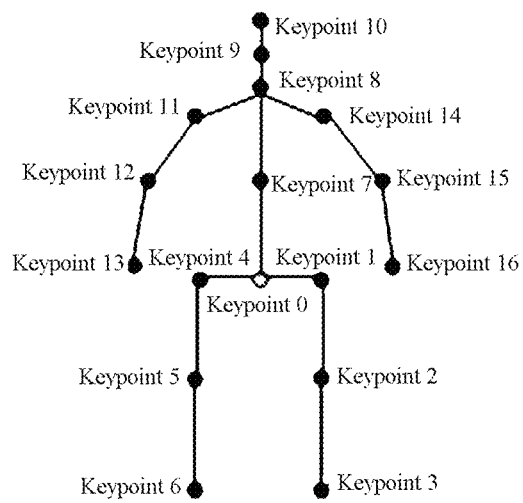
FIG. 8A is a schematic diagram of one keypoint provided by the embodiments of the present disclosure.

In some other embodiments, the second reference point can be the same as the first reference point. For example, both the first reference point and the second reference point can be a root node of the human body, and the root node of the human body can be a midpoint of a connection line of two keypoints of crotches of the human body. The root node includes, but is not limited to a keypoint 0 shown in FIG. 8A. FIG. 8A is a schematic diagram of the skeleton of the human body and includes a total of 17 skeleton keypoints labeled 0 to 16.

In some other embodiments, controlling the movement of the connection portion of the controlled model based on the absolute rotation information further includes: decomposing the absolute rotation information according to the drawing hierarchical relation among the multiple connection portions in the target to obtain relative rotation information; and controlling the movement of the connection portion of the controlled model based on the relative rotation information.

In some embodiments, controlling the movement of the connection portion of the controlled model based on the absolute rotation information further includes: correcting the relative rotation information according to a second constraint condition. Controlling the movement of the connection portion of the controlled model based on the relative rotation information includes: controlling the movement of the connection portion of the controlled model based on the corrected relative rotation information.

In some embodiments, the second movement constraint condition includes: a rotatable angle of the connection portion.

In some embodiments, the method further includes: performing posture defect correction on the second-type movement information to obtain the corrected second-type movement information. Controlling the movement of the connection portion of the controlled model according to the second-type movement information includes: controlling the movement of the connection portion of the controlled model by using the corrected second-type movement information.

For example, some users may have problems such as inconsistent body shapes and uncoordinated walking. In order to reduce the case that a controlled model directly imitates weird actions, in the present embodiments, posture defect correction can be performed on the second-type movement information to obtain the corrected second-type movement information.

Figure 5A:
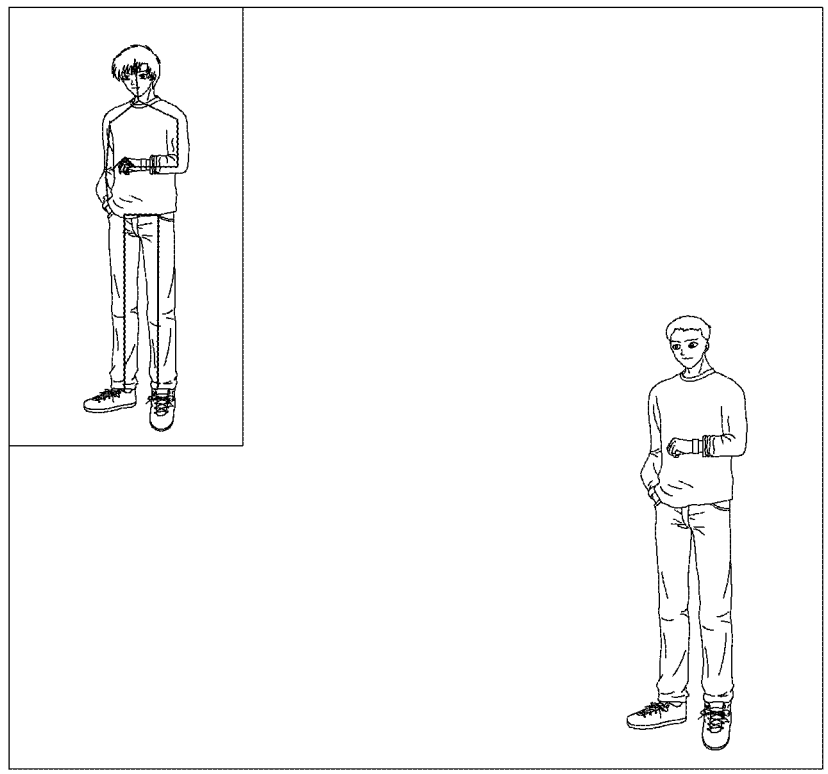
FIG. 5A to FIG. 5C are schematic diagrams of changes in the hand movements of an acquired user simulated by a controller model provided by the present embodiments.
Figure 5B:
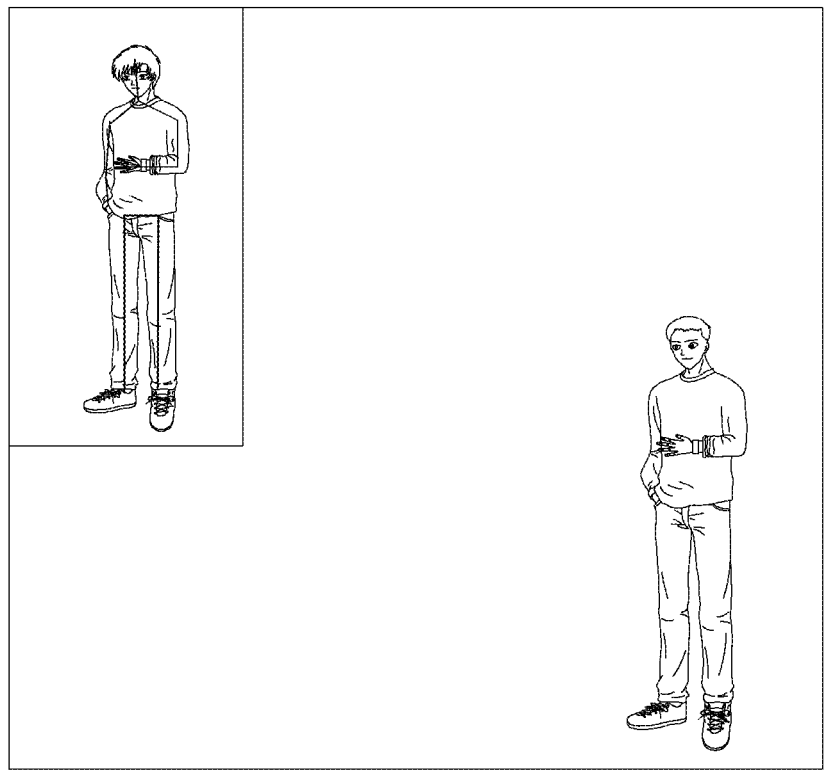
Figure 5C:
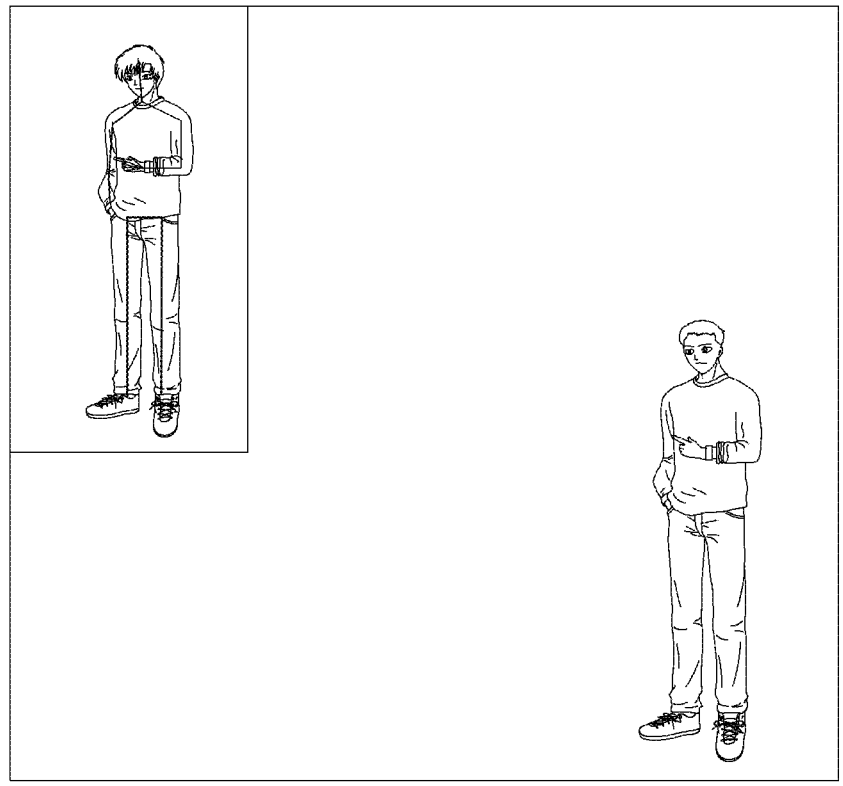

As shown in FIG. 5A, FIG. 5B, and FIG. 5C, the small image in the upper left corner is an acquired image, and the image in the lower right corner is a controlled model of the human body. The user's hand is moving. From FIG. 5A to FIG. 5B, and then from FIG. 5B to FIG. 5C, the user's hand keeps moving, and the controlled model's hand also keeps moving accordingly. The user's hand movements are sequentially changed from fist, palm extension, and index finger extension, and the controlled model's hand movements imitate the user's gestures from fist, palm extension, and index finger extension.

Figure 6A:
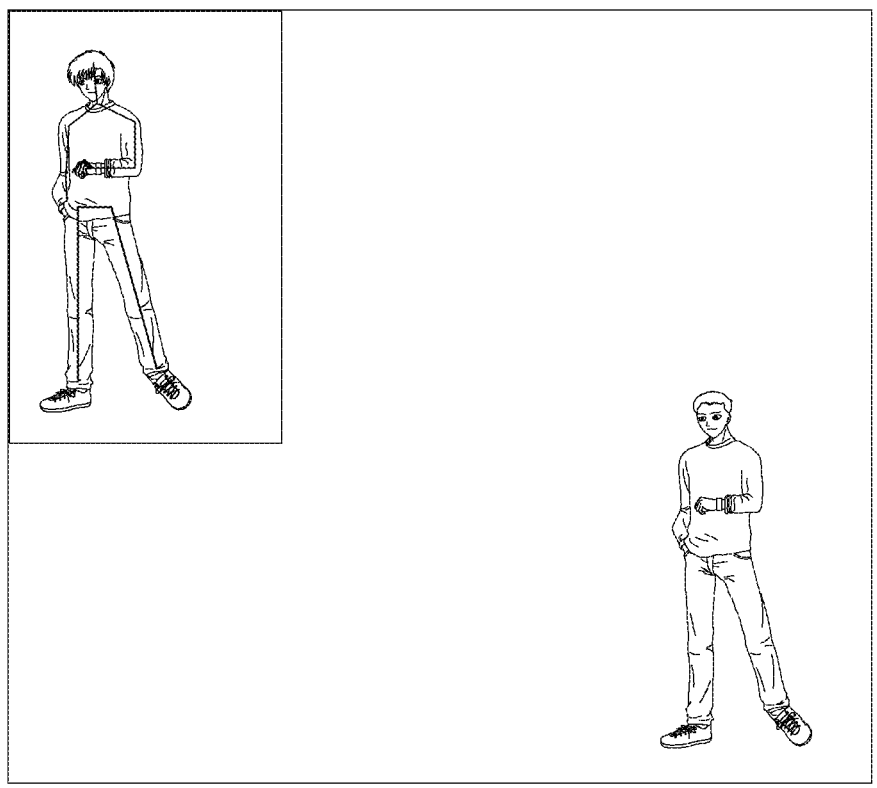
FIG. 6A to FIG. 6C are schematic diagrams of changes in the torso movements of an acquired user simulated by a controller model provided by the embodiments of the present disclosure.
Figure 6B:
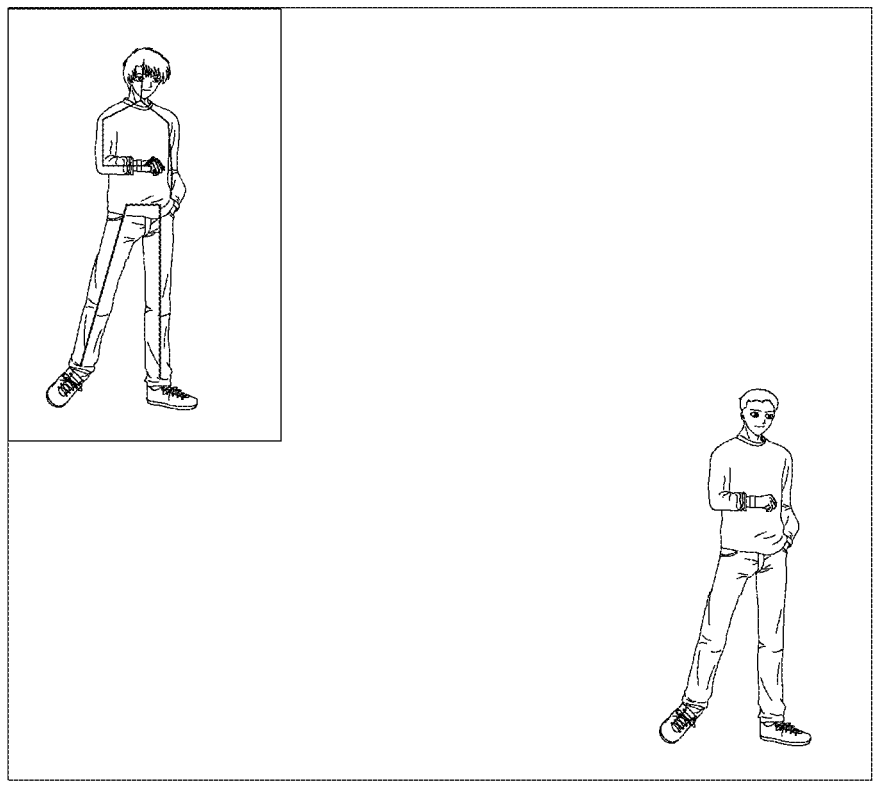
Figure 6C:
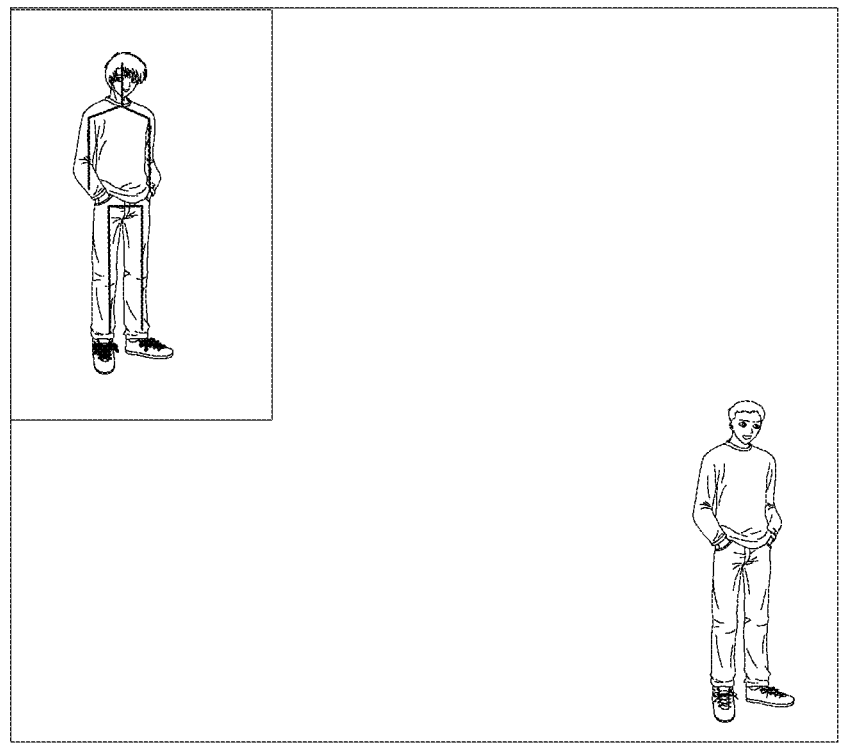

As shown in FIG. 6A, FIG. 6B, and FIG. 6C, the small image in the upper left corner is an acquired image, and the image in the lower right corner is a controlled model of the human body. From FIG. 6A to FIG. 6C, the user walks to the right of the image, walks to the left of the image, and finally stands straight, and the controlled model also imitates the user's foot movements.

In some embodiments, the step S120 can include: obtaining a first 2D coordinate of the limb based on a 2D image. The step S130 can include: obtaining a first 3D coordinate corresponding to the first 2D coordinate based on the first 2D coordinate and the conversion relation from a 2D coordinate to a 3D coordinate.

The 2D coordinate is a coordinate in a plane coordinate system, and the 3D coordinate is a coordinate in a 3D coordinate system. The 2D coordinate can represent the coordinate of a keypoint in the plane, while the 3D coordinate represents the coordinate in the dimensional space.

The conversion relation can be different types of preset conversion functions. For example, taking the position of an image acquisition module as a virtual viewpoint, the corresponding virtual 3D space is set when an acquisition target and the image acquisition module are at a predetermined distance, and the 2D coordinate is projected to the 3D space so as to obtain a first 3D coordinate corresponding to the first 2D coordinate.

In some other embodiments, the step S120 can include: obtaining a second 3D coordinate of a skeleton keypoint of the limb based on a 3D image. The step S130 can include: obtaining a third 3D coordinate based on the second 3D coordinate.

For example, the 3D image obtained in the step S110 includes: a 2D image and a depth image corresponding thereto, where the 2D image can provide a coordinate value of the skeleton keypoint in the xoy plane, and the depth value in the depth image can provide the coordinate of the skeleton keypoint on a z-axis. The z-axis is perpendicular to the xoy plane.

A 3D coordinate of the skeleton keypoint of the limb corresponding to the occluded portion in the 3D image is adjusted based on the second 3D coordinate so as to obtain the third 3D coordinate.

Furthermore, obtaining the third 3D coordinate based on the second 3D coordinate includes: adjusting, based on the second 3D coordinate, a 3D coordinate of the skeleton keypoint of the limb corresponding to the occluded portion in the 3D image so as to obtain the third 3D coordinate.

For example, a user laterally faces an image acquisition module; the depth value of the position of knees of both legs in the depth image is the same. In this case, the knee closer to the image acquisition module shields the knee relatively distant from the image acquisition module. In order to reduce the problem of inaccurate extraction of the 3D coordinate in the depth image caused by the shielding, the 3D coordinate for more precisely representing first-type movement information can be obtained by adjusting the 3D coordinate of a skeleton keypoint by using a deep learning model, a machine learning model, etc.

In some embodiments, the first-type movement information includes a quaternion.

The spatial location of a second-type part and/or rotations thereof on different directions can be precisely represented by using a quaternion. In addition to the quaternion, the first-type movement information can be also represented by an Euler coordinate, a Lagrange coordinate, and other coordinates.

Figure 7:
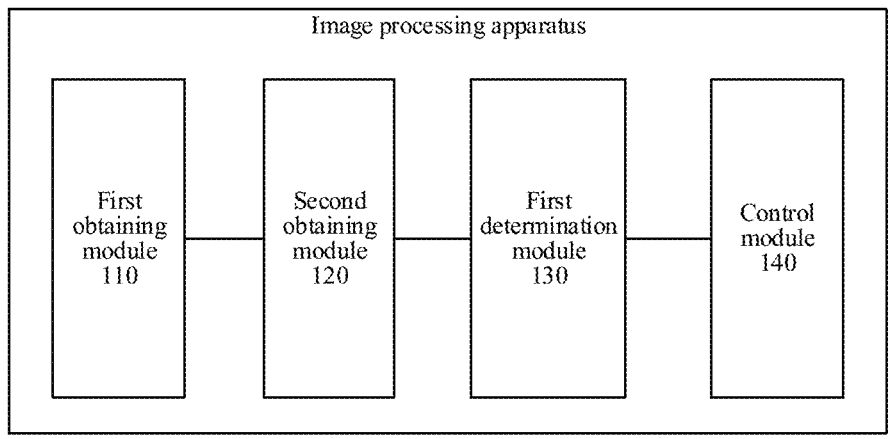
FIG. 7 is a schematic structural diagram of an image processing apparatus provided by the embodiments of the present disclosure.

As shown in FIG. 7, the present embodiments provide an image processing apparatus, including: a first obtaining module 110 configured to obtain an image; a second obtaining module 120 configured to obtain the feature of the limb of the body based on the image, where the limb includes the upper limb and/or the lower limb; a first determination module 130 configured to determine first-type movement information of the limb based on the feature; and a control module 140 configured to control the movement of the limb of a controlled model according to the first-type movement information.

In some embodiments, the first obtaining module 110, the second obtaining module 120, the first determination module 130, and the control module 140 can be program modules. After the program modules are executed by a processor, obtaining of an image, determination of the feature of the limb, determination of first-type movement information, and control of the movement of a controlled model can be carried out.

In some other embodiments, the first obtaining module 110, the second obtaining module 120, the first determination module 130, and the control module 140 can be soft and hard combination modules, and the soft and hard combination modules can include different programmable arrays. The programmable arrays include, but are not limited to field-programmable arrays or complex programmable arrays.

In still other embodiments, the first obtaining module 110, the second obtaining module 120, the first determination module 130, and the control module 140 can be pure hardware modules, and the pure hardware modules include, but are not limited to application-specific integrated circuits.

In some embodiments, the first determination module 130 is specifically configured to detect position information of a keypoint of the limb in the image; and determine the first-type movement information according to the position information.

In some embodiments, the apparatus further includes: a detection module configured to detect position information of a keypoint of the body skeleton in the image, and the second obtaining module 120 is specifically configured to determine position information of a keypoint of the limb based on the position information of the keypoint of the body skeleton.

In some embodiments, the first determination module 130 is specifically configured to determine a position box including a first part of the limb in the image according to position information of a keypoint of the limb; detect position information of a keypoint of the first part based on the position box; and obtain first-type movement information of the first part based on the position information of the keypoint of the first part.

In some embodiments, the first determination module 130 is specifically configured to determine a position box including the hand in the image according to position information of a hand keypoint.

In some embodiments, the first determination module 130 is further configured to detect, based on the position box, position information of a keypoint corresponding to a finger joint and/or position information of a keypoint corresponding to a fingertip on the hand.

In some embodiments, the first determination module 130 is further configured to obtain movement information of a finger of the hand based on the position information of a keypoint of the first part.

In some embodiments, the first determination module 130 is further configured to determine first-type movement information of a second part of the limb according to position information of a keypoint of the limb.

In some embodiments, the apparatus further includes: a second determination module configured to determine, based on position information of keypoints of two parts of the limb connected by means of a connection portion, second-type movement information of the connection portion.

In some embodiments, the apparatus further includes: a connection portion control module configured to determine second-type movement information of the connection portion of the at least two parts according to features of the at least two parts and a first movement constraint condition of the connection portion; and control the movement of the connection portion of the controlled model according to the second-type movement information.

In some embodiments, the connection portion control module is further configured to determine the control mode of controlling the connection portion according to the type of the connection portion; and control the movement of the connection portion of the controlled model according to the control mode and the second-type movement information.

In some embodiments, the connection portion control module is further configured to, in the case that the connection portion is a first-type connection portion, determine that the control mode is a first-type control mode, where the first-type control mode is used for directly controlling the movement of a connection portion in the controlled model corresponding to the first-type connection portion.

In some embodiments, the connection portion control module is further configured to, in the case that the connection portion is a second-type connection portion, determine that the control mode is a second-type control mode, where the second-type control mode is used for indirectly controlling the movement of the connection portion in the controlled model corresponding to the second-type connection portion; and the indirect control is achieved by controlling the part in the controlled model corresponding to the part other than the second-type connection portion.

In some embodiments, the connection portion control module is further configured to, in the case that the control mode is the second-type control mode, decompose the second-type movement information to obtain first-type rotation information of the connection portion that a drawing portion draws the connection portion to rotate; adjust movement information of the drawing portion according to the first-type rotation information; and control the movement of the drawing portion in the controlled model by using the adjusted movement information of the drawing portion so as to indirectly control the movement of the connection portion.

In some embodiments, the connection portion control module is further configured to decompose the second-type movement information to obtain second-type rotation information of the second-type connection portion rotating relative to the drawing portion; and control the rotation of the connection portion relative to the drawing portion in the controlled model by using the second-type rotation information.

In some embodiments, the first-type connection portion includes the elbow and the knee, and the second-type connection portion includes the wrist and the ankle.

In some embodiments, if the second-type connection portion is the wrist, the drawing portion corresponding to the wrist includes the upper arm and/or forearm, and/or if the second-type connection portion is the ankle, the drawing portion corresponding to the ankle includes the thigh or the shank.

In some embodiments, the second obtaining module 120 is specifically configured to obtain a first 2D coordinate of the limb based on a 2D image, and the first determination module 130 is configured to obtain a first 3D coordinate corresponding to the first 2D coordinate based on the first 2D coordinate and the conversion relation from a 2D coordinate to a 3D coordinate.

In some embodiments, the second obtaining module 120 is specifically configured to obtain a second 3D coordinate of a skeleton keypoint of the limb based on a 3D image, and the first determination module 130 is specifically configured to obtain a third 3D coordinate based on the second 3D coordinate.

In some embodiments, the first determination module 130 is specifically configured to adjust, based on the second 3D coordinate, a 3D coordinate of the skeleton keypoint of the limb corresponding to the occluded portion in the 3D image so as to obtain the third 3D coordinate.

In some embodiments, the first-type movement information includes a quaternion.

By combining any of the foregoing embodiments, the following specific examples are provided as follows:

Example 1

The present example provides an image processing method, including: acquiring, by a camera, pictures, first detecting an image for each picture, and then detecting keypoints of the hand and the wrist of the human body, determining a position box of the hand according to the keypoints, obtaining 14 keypoints and 63 contour points of the body skeleton, learning the position of the hand after detecting the keypoints, and calculating a hand box. The hand box here corresponds to the position box.

In general, the hand box does not include the wrist. However, in some cases such as when the position tilts, a part of the wrist can be included. The keypoint of the wrist can be equivalent to a central point at the position where the hand is connected to the arm.

After a keypoint of the human body and a keypoint of the hand are obtained, a 2D coordinate of the points can be input to the existing neural network to calculate a 3D coordinate of the points. A 2D point is input, and a 3D point is output in the network.

After a 3D coordinate of a skeleton keypoint is obtained, it is impossible to directly drive a virtual model. An angle parameter of the skeleton is further required to be calculated. For example, an angle where the arm bends can be calculated according to the position of three keypoints of the arm, and then is assigned to a controlled model such as Avatar model. In this way, when people do actions, the Avatar model does the same actions. A quaternion, which is a common tool for expressing an angle, can be assigned to the Avatar model.

In a 3D case, depth information, i.e., a depth value of a z-axis, can be obtained according to Time of Flight (TOF) information (the TOF information is original information of the depth information). An image coordinate system of a 2D image, i.e., the xoy plane, and the depth value on the z-axis are changed into a 3D coordinate system. Some 3D coordinate points may be occluded in a 3D image converted from a 2D image. The occluded points can be completed after learning by deep models such as a neural network. After network learning, a complete body skeleton can be obtained. The effect is better after using TOF because 2D RGB images have no depth perception, and input information is stronger after the depth information is available, which can improve the precision.

In the present example, the controlled model can be a game character in a game scene, a teacher model in an online education video in an online teaching scene, or a virtual streamer in a virtual streamer scene. In a word, the controlled model is determined according to the application scene. The model and/or appearance of the controlled model are different depending on different application scenes.

For example, in traditional mathematics, physics and other lecture scenes, the teacher model's clothing may be relatively stable, such as suits. For another example, for sports teaching scenes such as yoga or gymnastics, the controlled model may be wearing sportswear.

Example 2

The present example provides an image processing method. The method includes the following steps: acquiring an image including a target, where the target includes, but is not limited to the human body; and detecting a torso keypoint and a limb keypoint of the human body, where both the torso keypoint and/or the limb keypoint can be 3D keypoints represented by a 3D coordinate. The 3D coordinate can be obtained by detecting a 2D coordinate from a 2D image, and then using a conversion algorithm from the 2D coordinate to a 3D coordinate, or extracted from a 3D image acquired by a 3D camera. The limb keypoint can include an upper limb keypoint and/or lower limb keypoint. Taking the hand as an example, a hand keypoint of the upper limb keypoint includes, but is not limited to a wrist joint keypoint, a finger-palm joint keypoint, a finger joint keypoint, and a fingertip keypoint. The position of these points can reflect the movements of the hand and fingers. The torso keypoint is converted into a quaternion for representing the movement of the torso. The quaternion can be called as a torso quaternion. The limb keypoint is converted into a quaternion for representing the movement of the limb. The metadata can be called as a limb quaternion. The torso quaternion is used for controlling the torso of a controlled model to move, and the limb quaternion is used for controlling the limb of the controlled model to move.

The torso keypoint and the limb keypoint can include 14 keypoints or 17 keypoints. FIG. 8A shows 17 keypoints.

In the present example, the controlled model can be a game character in a game scene, a teacher model in an online education video in an online teaching scene, or a virtual streamer in a virtual streamer scene. In a word, the controlled model is determined according to the application scene. The model and/or appearance of the controlled model are different depending on different application scenes.

For example, in traditional mathematics, physics and other lecture scenes, the teacher model's clothing may be relatively stable, such as suits. For another example, for sports teaching scenes such as yoga or gymnastics, the controlled model may be wearing sportswear.

Example 3

The present example provides an image processing method. The method includes the following steps: obtaining an image including a target, where the target can be the human body; obtaining the 3D posture of the target in the 3D space according to the image, where the 3D posture can be represented by a 3D coordinate of a skeleton keypoint of the human body; obtaining an absolute rotation parameter of the joint of the human body in a camera coordinate system, where the absolute rotation position can be calculated according to the coordinate in the camera coordinate system; obtaining the coordinate direction of the joint according to the coordinate; and determining a relative rotation parameter of the joint according to the hierarchical relation. Determining the relative parameter specifically includes: determining the position of a root node of the joint keypoint relative to the human body, where the relative rotation parameter can be used for representing a quaternion. The hierarchical relation here can be the drawing relation among joints. For example, the movement of the elbow joint causes the movement of the wrist joint to some extent, the movement of the shoulder joint also causes the movement of the elbow joint, etc. The hierarchical relation can be determined in advance according to the joint of the human body. The quaternion is used for controlling the rotation of a controlled model.

For example, taking the hierarchical relation as an example, a first level is pelvis; a second level is waist; a third level is thigh (e.g. left thigh and right thigh); a fourth level is shank (e.g. left shank and right shank); a fifth level is foot.

For another example, another hierarchical relation is as follows: a first level is chest; a second level is neck; a third level is head.

Furthermore, for example, still another hierarchical relation is as follows: a first level is clavicle, which corresponds to the shoulder; a second level is upper arm; a third level is forearm (which is also called as lower arm); a fourth level is hand.

The hierarchical relation decreases in sequence from the first level to the fifth level. The movement of a part at a high level affects the movement of a part at a low level. Therefore, the level of a drawing portion is higher than that of a connection portion.

When determining the second-type movement information, first, movement information of keypoints of parts at different levels is obtained, and then movement information of a keypoint of a part at a low level relative to a keypoint of a part at a high level (i.e., the relative rotation information).

For example, if a quaternion is used for representing movement information, the relative rotation information can be represented by the formula (1) below: rotation quaternions of each keypoint relative to a camera coordinate system are $\{Q_0, Q_1, \ldots, Q_{18}\}$, and then a rotation quaternion $q_i$ of each keypoint relative to a parent keypoint is calculated.

$$q_i = Q_{parent(i)}^{-1} \cdot Q_i \quad (1)$$

The parent keypoint parent(i) is the previous level of keypoint of the current keypoint i. $Q_i$ is a rotation quaternion of the current keypoint i relative to a camera coordinate system. $Q_{parent(i)}^{-1}$ is an inverse rotation parameter of the previous level of keypoint. For example, $Q_{parent(i)}$ is a rotation parameter of the previous level of keypoint, and a rotation angle thereof is 90 degrees, a rotation angle of $Q_{parent(i)}^{-1}$ is −90 degrees.

Controlling the movement of joints of the controlled model by using the quaternion can include: controlling the movement of joints of the controlled model by using $q_i$.

Another image processing method, further including: converting the quaternion into a first Euler angle; transforming the first Euler angle to obtain a second Euler angle within a constraint condition, where the constraint condition can be used for limiting the first Euler angle; and obtaining a quaternion corresponding to the second Euler angle, and then controlling the rotation of the controlled model by using the quaternion. Obtaining a quaternion corresponding to the second Euler angle can directly convert the second Euler angle into a quaternion.

Figure 8B:
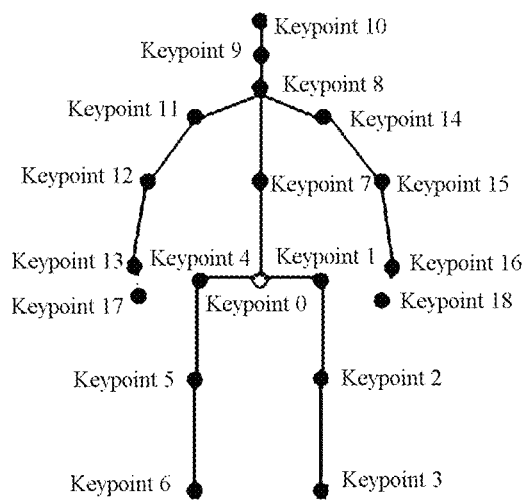
FIG. 8B is a schematic diagram of another keypoint provided by the embodiments of the present disclosure.

Taking the human body as an example, keypoints of 17 joints can be detected by human body detection. In addition, two keypoints are also set corresponding to left and right hands; therefore, there are a total of 19 keypoints. FIG. 8A is a schematic diagram of the skeleton of 17 keypoints. FIG. 8B is a schematic diagram of the skeleton of 19 keypoints. FIG. 8A is a schematic diagram formed for bones shown in FIG. 8B. The bones shown in FIG. 8B can correspond to 19 keypoints, i.e., pelvis, waist, left thigh, left shank, left foot; right thigh, right shank, right foot, chest, neck, head, left clavicle, right clavicle, right upper arm, right forearm, right hand, left upper arm, left forearm, and left hand.

First, coordinates of 17 keypoints in an image coordinate system can be obtained by detecting keypoints of joints of the human body in an image, and are specifically as: S={($x_0$, $y_0, z_0), \ldots, (x_{16}, x_{16}, z_{16})\}$. $(x_i, y_i, z_i)$ can be the coordinate of an $i^{th}$ keypoint, and values of i are 0 to 16.

Coordinates of keypoints of 19 joints in respective local coordinate systems are defined as follows: $A=\{(p_0, q_0), \ldots, (p_{18}, q_{18})\}$, where $p_i$ indicates a 3D coordinate of a node i in a local coordinate system, is generally a fixed value carried by an original model, and is not required to be modified or transferred; $q_i$ is a quaternion, and indicates the rotation of a bone controlled by a node i in a parent node coordinate system thereof, which can be also considered as the rotation of a local coordinate system of the current node and a local coordinate system of a parent node.

Figure 9:
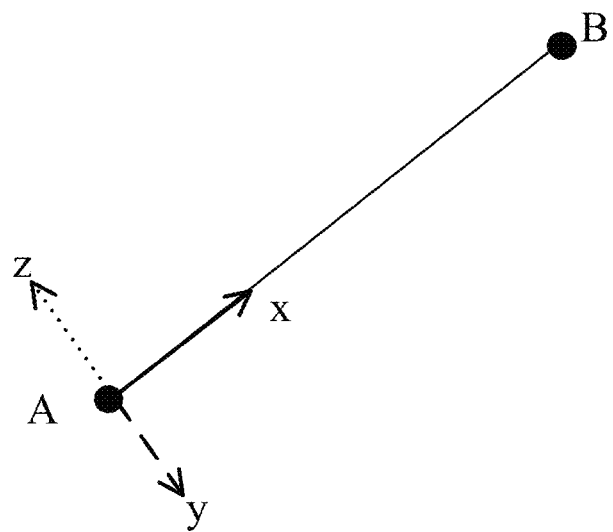
FIG. 9 is a schematic diagram of establishing a local coordinate system in the embodiments of the present disclosure.

The process of calculating quaternions of keypoints corresponding to joints is as follows: determining the coordinate axis direction of a local coordinate system of each node; taking the direction where a child node points to a parent node as an x-axis for each bone; taking the vertical direction of the plane where two bones connected to one node are located as a z-axis; and if a rotation axis cannot be determined, taking the direction where the human body faces as a y-axis. FIG. 9 is a schematic diagram of a local coordinate system where a node A is located.

In the present example, the left-hand coordinate system is used for explaining, and the right-hand coordinate system can also be used in the specific implementation.

| Numbers of bone nodes of 19 points | Calculated by using keypoints in 17 skeleton points |
|---|---|
| 0 | Take (1-7) × (1-4) as a y-axis, and (7-0) as an x-axis |
| 1 | Take the maximum default value of 3D coordinates |
| 2 | Take (14-11) × (14-7) as a y-axis, and (8-7) as an x-axis |
| 3 | Take the maximum default value of 3D coordinates |
| 4 | Take (10-8) as an x-axis, and (9-10) × (9-8) as a z-axis |
| 5 | Take (11-8) as an x-axis, and (12-11) × (11-8) as a y-axis |
| 6 | Take (12-11) as an x-axis, and (11-12) × (12-13) as a z-axis |
| 7 | Take (13-12) as an x-axis, and (11-12) × (12-13) as a z-axis. Note: the node changes after a quaternion of the hand is subsequently added. |
| 9 | Take (5-4) as an x-axis, and (5-6) × (5-4) as a z-axis |
| 10 | Take (6-5) as an x-axis, and (5-6) × (5-4) as a z-axis |
| 12 | Take (14-8) as an x-axis, and (8-14) × (14-15) as a y-axis |
| 13 | Take (15-14) as an x-axis, and (14-15) × (15-16) as a z-axis |
| 14 | Take (16-15) as an x-axis, and (14-15) × (15-16) as a z-axis. Note: the node changes after a quaternion of the hand is subsequently added. |
| 16 | Take (2-1) as an x-axis, and (2-3) × (2-1) as a z-axis |
| 17 | Take (3-2) as an x-axis, and (2-3) × (2-1) as a z-axis |

(i-j) in the table above indicates a vector where i points to j, and × indicates cross product. For example, (1-7) indicates a vector where a first keypoint points to a seventh keypoint.

Figure 8C:
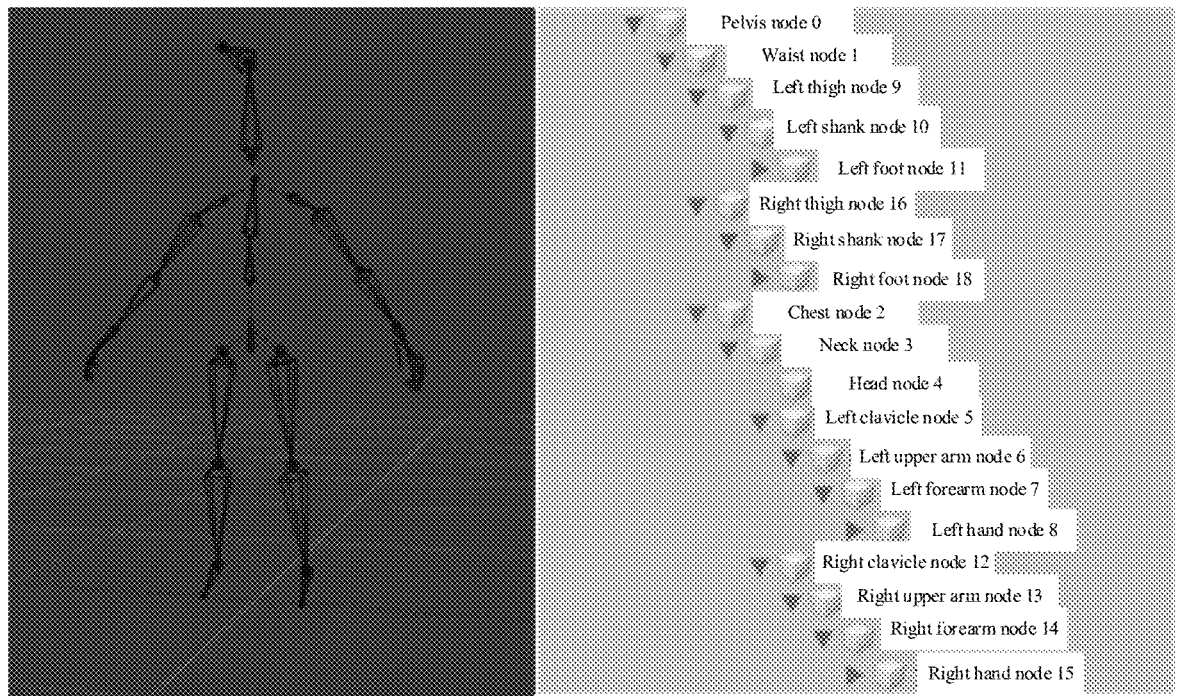
FIG. 8C is a schematic diagram of the hierarchical relation among first nodes provided by the embodiments of the present disclosure.

In the table above, nodes 8, 15, 11, and 18 are four nodes of the hand and foot. Quaternions of the four nodes can be determined only when specific postures are used; therefore, the four nodes are not included in this table. In addition, in the table above, the numbers of bone nodes of 19 points are shown in FIG. 8C, and the numbers of keypoints in 17 skeleton points are shown in FIG. 8A.

The process of calculating the first Euler angle is as follows: after calculating a local rotation quaternion $q_i$ of joint points, first, converting same into an Euler angle, where the order of x-y-z is used by default; and setting $q_i=(q0, q1, q2, q3)$, where q0 is a real number; and q1, q2, q3 are all imaginary numbers. Therefore, the calculation formulas (2)-(4) of the Euler angle are as follows:

$$X=a \tan 2(2*(q0*q1-q2*q3), 1-2*(q1*q1+q2*q2)) \quad (2)$$

$$Y=a \sin(2*(q1*q3+q0*q2)) \text{ and the value of } Y \text{ ranges from } -1 \text{ to } 1 \quad (3)$$

$$Z=a \tan 2(2*(q0*q3-q1*q2), 1-2*(q2*q2+q3*q3)) \quad (4)$$

Y is an Euler angle in a first direction; Y is an Euler angle in a second direction; and Z is an Euler angle in a third direction. Any two of the first direction, the second direction, and the third direction are perpendicular to each other.

Three angles of (X, Y, Z) can be then limited. If the angles exceed the range, the angles are defined within boundary values to obtain adjusted second Euler angles (X', Y' Z'), and a rotation quaternion $q_i'$ of a new local coordinate system is restored.

Another image processing method, further including: performing posture optimization adjustment on second Euler angles, for example, adjusting some of second Euler angles into Euler angles performed posture optimization based on a preset rule so as to obtain third Euler angles. Therefore, obtaining a quaternion corresponding to the second Euler angle can include: converting a third Euler angle into a quaternion controlling a controlled model.

Still another image processing method, further including: after converting a second Euler angle into a quaternion, performing posture optimization on the converted metadata, for example, adjusting based on a preset rule to obtain an adjusted quaternion, and controlling the controlled model according to the finally adjusted quaternion.

In some embodiments, a second Euler angle or a quaternion obtained by conversion from a second Euler angle can be adjusted based on a preset rule or optimized and adjusted by a deep learning model. There are a large variety of implementation modes, which is not limited in the present application.

In addition, another image processing method can further include pre-processing. For example, the width of the crotch and/or shoulder of a controlled model is modified according to the size of the acquired human body so as to correct the overall posture of the human body. The standing posture of the human body can be corrected for standing upright and belly straightening. Some people lift their stomachs when standing up, and stomach lifting correction makes a controlled model not simulate the user's stomach lifting. Some people bend when standing up, and hunch correction makes a controlled model not simulate the user's hunch movement, etc.

Example 4

The present example provides an image processing method, including the following steps: obtaining an image including a target, where the target can include at least one of the human body, the human upper limb, or the human lower limb; obtaining a coordinate system of a target joint according to position information of the target joint in an image coordinate system; obtaining a coordinate system of a part of the limb which causes the target joint to move according to position information of a part of the limb in the image coordinate system; determining the rotation of the target joint relative to a part of the limb based on the coordinate system of the target joint and the coordinate system of a part of the limb to obtain a rotation parameter including a self-rotation parameter of the target joint and a rotation parameter caused by a part of the limb; limiting the rotation parameter caused by a part of the limb by using a first angle limitation to obtain a final drawing rotation parameter; adjusting the rotation parameter of a part of the limb according to the final drawing rotation parameter; obtaining a relative rotation parameter according to a coordinate system of a first limb and the corrected rotation parameter of a part of the limb; performing second angle limitation on the relative rotation parameter to obtain a limited relative rotation parameter; obtaining a quaternion according to the limited rotation parameter; and controlling the movement of the target joint of a controlled model according to the quaternion.

For example, when the human upper limb is processed, a coordinate system of the hand in an image coordinate system is obtained, and a coordinate system of the lower arm and a coordinate system of the upper arm are also obtained. In this case, the target joint is the wrist joint. The rotation of the hand relative to the lower arm is decomposed into self-rotation and caused rotation. The caused rotation is transferred to the lower arm, specifically, the caused rotation is assigned to the rotation of the lower arm in the corresponding direction. The maximum rotation of the lower arm is limited by using a first angle limitation of the lower arm, and then the rotation of the hand relative to the corrected lower arm to obtain a relative rotation parameter. A second angle limitation is performed on the relative rotation parameter to obtain the rotation of the hand relative to the lower arm.

When the human lower limb is processed, a coordinate system of the foot in an image coordinate system is obtained, and a coordinate system of the shank and a coordinate system of the thigh are also obtained. In this case, the target joint is the ankle joint. The rotation of the foot relative to the shank is decomposed into self-rotation and caused rotation. The caused rotation is transferred to the shank, specifically, the caused rotation is assigned to the rotation of the shank in the corresponding direction. The maximum rotation of the shank is limited by using a first angle limitation of the shank, and then the rotation of the foot relative to the corrected shank to obtain a relative rotation parameter. A second angle limitation is performed on the relative rotation parameter to obtain the rotation of the foot relative to the shank.

Figure 10:
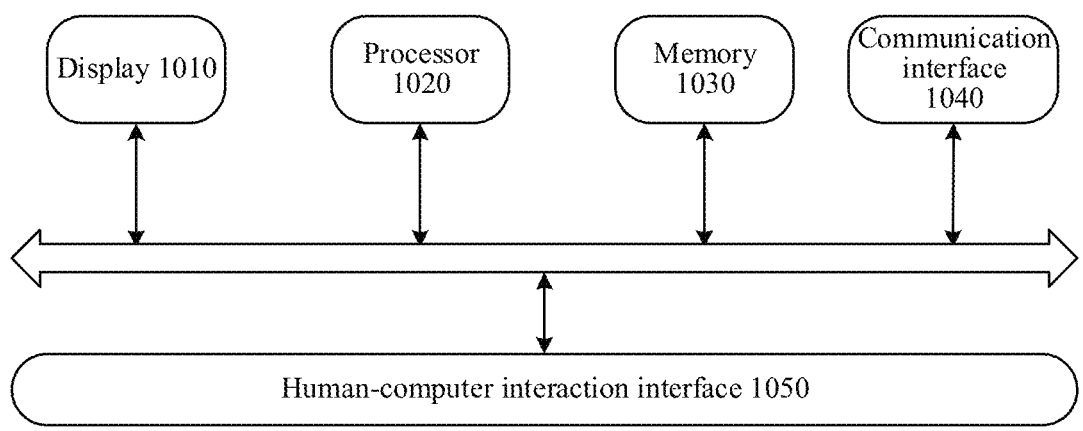
FIG. 10 is a schematic structural diagram of an image device provided by the embodiments of the present disclosure.

As shown in FIG. 10, the embodiments of present application provide an image device, including: a memory 1030 configured to store information; and a processor 1020 connected to the memory 1030 and configured to implement, by executing computer executable instructions stored on the memory 1030, the image processing method provided by one or more of the foregoing technical solutions, for example, the image processing methods shown in FIG. 1, FIG. 2 and/or FIG. 4.

The memory 1030 may be various types of memory, such as random-access memory, read-only memory, and flash memory. The memory 1030 can be configured to store information, for example, storing computer executable instructions, etc. The computer executable instructions may be various program instructions, for example, a target program instruction and/or a source program instruction.

The processor 1020 may be various types of processors, for example, a central processing unit, a microprocessor, a digital signal processor, a programmable array, a digital signal processor, an application-specific integrated circuit, an image processor, etc.

The processor 1020 may be connected to the memory 1030 by means of a bus. The bus may be an integrated circuit bus, etc.

In some embodiments, the terminal device may further include: a communication interface 1040. The communication interface 1040 may include a network interface, for example, a local area network interface, a transceiver antenna, etc. The communication interface 1040 is also connected to the processor 1020 and can be configured to send and receive information.

In some embodiments, the terminal device further includes a human-computer interaction interface 1050. For example, the human-computer interaction interface 1050 may include various input and output devices such as a keyboard and a touch screen.

In some embodiments, the image device further includes: a display 1010 which can display different prompts, acquired face images and/or interfaces.

The embodiments of the present application provide a non-volatile computer storage medium. The computer storage medium stores computer executable codes. After the computer executable codes are executed, the image processing method provided by one or more of the foregoing technical solutions can be implemented, for example, the image processing methods shown in FIG. 1, FIG. 2, and/or FIG. 4.

The device embodiments described above are merely exemplary. For example, the unit division is merely logical function division and may be actually implemented in other division manners. For example, a plurality of units or components may be combined or integrated into another system, or some features may be ignored or not performed. In addition, the displayed or discussed mutual couplings or direct couplings or communication connections among parts of the components may be implemented by means of some ports. The indirect couplings or communication connections between the devices or units may be electrical, mechanical, or in other forms.

The units described as separate components may or may not be physically separate, and the components displayed as units may or may not be physical units, i.e., may be located at one position, or may be distributed on a plurality of network units. Some or all of the units may be selected according to actual needs to achieve the objectives of the solutions of the embodiments.

In addition, the functional units in the embodiments of the present application may be all integrated into one processing module, or each of the units may respectively serve as an independent unit, or two or more units are integrated into one unit, and the integrated unit may be implemented in the form of hardware, or may also be implemented in the form of a hardware and software function unit.

A person of ordinary skill in the art may understand that all or some steps for implementing the foregoing method embodiments may be achieved by a program by instructing related hardware; the foregoing program can be stored in a computer readable storage medium; when the program is executed, steps including the foregoing method embodiments are performed. Moreover, the foregoing storage medium includes various media capable of storing a program code, such as a mobile storage device, a Read-Only Memory (ROM), a RAM, a magnetic disk, or an optical disk.

The descriptions above are only specific implementations of the present application. However, the scope of protection of the present application is not limited thereto. Within the technical scope disclosed by the present application, any variation or substitution that can be easily conceived of by those skilled in the art should all fall within the scope of protection of the present application. Therefore, the scope of protection of the present application should be determined by the scope of protection of the appended claims.

The invention claimed is:

1. An image processing method, comprising:
   obtaining an image;
   obtaining a feature of a limb of a body based on the image, wherein the limb comprises an upper limb and/or a lower limb;
   determining first-type movement information of the limb based on the feature;
   controlling movement of a limb of a controlled model according to the first-type movement information;
   obtaining, in the limb, two parts and a connection portion, wherein the two parts are connected through the connection portion;
   obtaining keypoints of the two parts;
   obtaining position information of the keypoints of the two parts;
   determining, based on the position information, second-type movement information of the connection portion;
   determining a control mode of controlling a connection portion of the controlled model according to a type of the connection portion; and
   controlling movement of the connection portion of the controlled model according to the control mode and the second-type movement information,
   wherein determining the control mode of controlling the connection portion of the controlled model according to the type of the connection portion comprises:
   in response to that the connection portion is a first-type connection portion, determining that the control mode is a first-type control mode, wherein the first-type connection portion rotates itself and comprises an elbow and a knee, and the first-type control mode is used for directly controlling movement of a connection portion in the controlled model corresponding to the first-type connection portion; and
   in response to that the connection portion is a second-type connection portion, determining that the control mode is a second-type control mode, wherein the second-type connection portion is a connection portion other than the first-type connection portion in the limb, a rotation of the second-type connection portion comprises a rotation generated by drawing of other parts, the second-type control mode is used for indirectly controlling movement of a connection portion in the controlled model corresponding to the second-type connection portion, and the indirectly controlling is achieved by controlling a part in the controlled model corresponding to a part other than the second-type connection portion.

2. The method according to claim 1, wherein determining the first-type movement information of the limb based on the feature comprises:
   detecting position information of a keypoint of the limb in the image; and
   determining the first-type movement information according to the position information of the keypoint of the limb.

3. The method according to claim 2, further comprising:
   obtaining a body skeleton from features of the body based on the image, and
   detecting position information of a keypoint of the body skeleton in the image; and
   wherein obtaining the feature of the limb of the body based on the image comprises:
   determining the position information of the keypoint of the limb based on the position information of the keypoint of the body skeleton.

4. The method according to claim 3, wherein determining the first-type movement information according to the position information of the keypoint of the limb comprises:
   determining a position box comprising a first part of the limb in the image according to the position information of the keypoint of the limb;
   detecting position information of a keypoint of the first part based on the position box; and
   obtaining first-type movement information of the first part based on the position information of the keypoint of the first part.

5. The method according to claim 4, wherein
   determining the position box comprising the first part of the limb in the image according to the position information of the keypoint of the limb comprises:
   determining a position box comprising a hand in the image according to position information of a hand keypoint;
   detecting the position information of the keypoint of the first part based on the position box comprising the first part of the limb comprises:
   detecting, based on the position box comprising the hand, position information of a keypoint corresponding to a finger joint and/or position information of a keypoint corresponding to a fingertip on the hand; and
   obtaining the first-type movement information of the first part based on the position information of the keypoint of the first part comprises:
   obtaining movement information of a finger of the hand based on the position information of the keypoint corresponding to the finger joint and/or the position information of the keypoint corresponding to the fingertip on the hand.

6. The method according to claim 3, wherein determining the first-type movement information of the limb based on the feature further comprises:
   determining first-type movement information of a second part of the limb according to the position information of the keypoint of the limb.

7. The method according to claim 1, further comprising:
   determining the second-type movement information of the connection portion according to features of at least two parts and a first movement constraint condition of the connection portion, wherein the at least two parts comprise the two parts connected through the connection portion.

8. The method according to claim 1, wherein controlling the movement of the connection portion of the controlled model according to the control mode and the second-type movement information comprises:
   in response to that the control mode is the second-type control mode, obtaining, by decomposing the second-type movement information, first-type rotation information of the connection portion that a drawing portion draws the connection portion to rotate;
   adjusting movement information of the drawing portion according to the first-type rotation information; and
   controlling movement of a drawing portion in the controlled model by using the adjusted movement information of the drawing portion, to indirectly control the movement of the connection portion.

9. The method according to claim 8, further comprising:
obtaining, by decomposing the second-type movement information, second-type rotation information of the second-type connection portion rotating relative to the drawing portion; and
controlling, in the controlled model, rotation of the connection portion relative to the drawing portion by using the second-type rotation information.

10. The method according to claim 8, wherein
the second-type connection portion comprises a wrist and an ankle;
in response to that the second-type connection portion is a wrist, the drawing portion corresponding to the wrist comprises an upper arm and/or a forearm; and
in response to that the second-type connection portion is an ankle, the drawing portion corresponding to the ankle comprises a shank and/or a thigh.

11. The method according to claim 1, wherein
obtaining the feature of the limb of the body based on the image comprises: obtaining a first 2-Dimensional (2D) coordinate of the limb based on a 2D image; and
determining the first-type movement information of the limb based on the feature comprises: obtaining a first 3-Dimensional (3D) coordinate corresponding to the first 2D coordinate based on the first 2D coordinate and a conversion relation from a 2D coordinate to a 3D coordinate.

12. The method according to claim 1, wherein
obtaining the feature of the limb of the body based on the image comprises: obtaining a body skeleton from features of the body based on the image, and obtaining a second 3D coordinate of a skeleton keypoint of the limb based on a 3D image; and
determining the first-type movement information of the limb based on the feature comprises: obtaining a third 3D coordinate based on the second 3D coordinate.

13. The method according to claim 12, wherein obtaining the third 3D coordinate based on the second 3D coordinate comprises:
adjusting, based on the second 3D coordinate, a 3D coordinate of the skeleton keypoint of the limb corresponding to an occluded portion in the 3D image, to obtain the third 3D coordinate.

14. The method according to claim 1, wherein the first-type movement information comprises a quaternion.

15. An image device, comprising:
a memory storing computer executable instructions; and
a processor coupled to the memory,
wherein the processor is configured to:
obtain an image;
obtain a feature of a limb of a body based on the image, wherein the limb comprises an upper limb and/or a lower limb;
determine first-type movement information of the limb based on the feature;
control movement of a limb of a controlled model according to the first-type movement information;
obtain, in the limb, two parts and a connection portion, wherein the two parts are connected through the connection portion;
obtain keypoints of the two parts;
obtain position information of the keypoints of the two parts;
determine, based on the position information, second-type movement information of the connection portion;
determine a control mode of controlling a connection portion of the controlled model according to a type of the connection portion; and
control movement of the connection portion of the controlled model according to the control mode and the second-type movement information,
wherein determining the control mode of controlling the connection portion of the controlled model according to the type of the connection portion comprises:
in response to that the connection portion is a first-type connection portion, determining that the control mode is a first-type control mode, wherein the first-type connection portion rotates itself and comprises an elbow and a knee, and the first-type control mode is used for directly controlling movement of a connection portion in the controlled model corresponding to the first-type connection portion; and
in response to that the connection portion is a second-type connection portion, determining that the control mode is a second-type control mode, wherein the second-type connection portion is a connection portion other than the first-type connection portion in the limb, a rotation of the second-type connection portion comprises a rotation generated by drawing of other parts, the second-type control mode is used for indirectly controlling movement of a connection portion in the controlled model corresponding to the second-type connection portion, and the indirectly controlling is achieved by controlling a part in the controlled model corresponding to a part other than the second-type connection portion.

16. A non-transitory computer storage medium storing computer executable instructions that are executed by a processor to:
obtain an image;
obtain a feature of a limb of a body based on the image, wherein the limb comprises an upper limb and/or a lower limb;
determine first-type movement information of the limb based on the feature;
control movement of a limb of a controlled model according to the first-type movement information;
obtain, in the limb, two parts and a connection portion, wherein the two parts are connected through the connection portion;
obtain keypoints of the two parts;
obtain position information of the keypoints of the two parts;
determine, based on the position information, second-type movement information of the connection portion;
determine a control mode of controlling a connection portion of the controlled model according to a type of the connection portion; and
control movement of the connection portion of the controlled model according to the control mode and the second-type movement information,
wherein determining the control mode of controlling the connection portion of the controlled model according to the type of the connection portion comprises:
in response to that the connection portion is a first-type connection portion, determining that the control mode is a first-type control mode, wherein the first-type connection portion rotates itself and comprises an elbow and a knee, and the first-type control mode is used for directly controlling movement of a connection portion in the controlled model corresponding to the first-type connection portion; and in response to that the connection portion is a second-type connection portion, determining that the control mode is a second-type control mode, wherein the second-type connection portion is a connection portion other than the first-type connection portion in the limb, a rotation of the second-type connection portion comprises a rotation generated by drawing of other parts, the second-type control mode is used for indirectly controlling movement of a connection portion in the controlled model corresponding to the second-type connection portion, and the indirectly controlling is achieved by controlling a part in the controlled model corresponding to a part other than the second-type connection portion.

* * * * *